(12) United States Patent
Baek et al.

(10) Patent No.: US 12,146,974 B2
(45) Date of Patent: Nov. 19, 2024

(54) METHOD OF TRANSMITTING CONTROL INFORMATION FOR SIDELINK POSITIONING, AND APPARATUS THEREFOR

(71) Applicant: LG ELECTRONICS INC., Seoul (KR)

(72) Inventors: Jongseob Baek, Seoul (KR); Woosuk Ko, Seoul (KR); Hanbyul Seo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 362 days.

(21) Appl. No.: 17/778,386

(22) PCT Filed: Nov. 16, 2020

(86) PCT No.: PCT/KR2020/016045
§ 371 (c)(1),
(2) Date: May 19, 2022

(87) PCT Pub. No.: WO2021/101182
PCT Pub. Date: May 27, 2021

(65) Prior Publication Data
US 2022/0397633 A1 Dec. 15, 2022

(30) Foreign Application Priority Data

Nov. 20, 2019 (KR) .................. 10-2019-0149431
Nov. 21, 2019 (KR) .................. 10-2019-0150022

(51) Int. Cl.
*H04W 72/20* (2023.01)
*G01S 5/00* (2006.01)
(Continued)

(52) U.S. Cl.
CPC .......... *G01S 5/0072* (2013.01); *H04L 5/0051* (2013.01); *H04W 4/40* (2018.02); *H04W 72/0446* (2013.01); *H04W 72/20* (2023.01)

(58) Field of Classification Search
CPC ............................... H04W 4/40; H04W 72/20
See application file for complete search history.

(56) References Cited

U.S. PATENT DOCUMENTS

| | | | |
|---|---|---|---|
| 2018/0014345 A1* | 1/2018 | Sartori | H04W 76/14 |
| 2020/0029318 A1* | 1/2020 | Guo | H04W 76/14 |
| 2020/0229205 A1* | 7/2020 | Bharadwaj | H04W 72/04 |

FOREIGN PATENT DOCUMENTS

WO 2017188547 11/2017

OTHER PUBLICATIONS

Huawei, HiSilicon, "Sidelink physical layer structure for NR V2X," 3GPP TSG-RAN WG1 Meeting #99, R1-1911882, Nov. 2019, 37 pages.
(Continued)

*Primary Examiner* — Michael T Vu
(74) *Attorney, Agent, or Firm* — LEE, HONG, DEGERMAN, KANG & WAIMEY

(57) ABSTRACT

The present disclosure relates to a method and apparatus of transmitting control information for sidelink positioning. The method of transmitting control information for sidelink positioning in an NR-V2X communication system according to one aspect may comprise the steps of: determining at least one transmission slot for transmission of first positioning sidelink control information (PSCI) and second PSCI; determining at least one physical channel for transmission of the first PSCI and the second PSCI; mapping the first PSCI and the second PSCI to the determined at least one transmission slot and the determined at least one physical channel; and transmitting the mapped first PSCI and the second PSCI. The apparatus is capable of communicating with at (Continued)

least one of another apparatus, a user equipment (UE) related to an autonomous driving vehicle, a base station (BS) or a network.

17 Claims, 25 Drawing Sheets

(51) Int. Cl.
*H04L 5/00* (2006.01)
*H04W 4/40* (2018.01)
*H04W 72/0446* (2023.01)

(56) References Cited

OTHER PUBLICATIONS

LG Electronics, "Discussion on physical layer structure for NR sidelink," 3GPP TSG-RAN WG1 Meeting #99, R1-1913235, Nov. 2019, 38 pages.
InterDigital Inc., "On Physical Layer Structure Design," 3GPP TSG-RAN WG1 Meeting #95, R1-1813226, Nov. 2018, 8 pages.
PCT International Application No. PCT/KR2020/016045, Written Opinion and International Search Report dated Mar. 11, 2021, 15 pages.

* cited by examiner (a)

(b)

METHOD OF TRANSMITTING CONTROL INFORMATION FOR SIDELINK POSITIONING, AND APPARATUS THEREFOR

CROSS-REFERENCE TO RELATED APPLICATIONS

This application is the National Stage filing under 35 U.S.C. 371 of International Application No. PCT/KR2020/016045, filed on Nov. 16, 2020, which claims the benefit of earlier filing date and right of priority to Korean Application Nos. 10-2019-0149431, filed on Nov. 20, 2019, and 10-2019-0150022, filed on Nov. 21, 2019, the contents of which are all incorporated by reference herein in their entirety.

TECHNICAL FIELD

The present disclosure relates to sidelink positioning, and more particularly to a technology for transmitting control information for sidelink positioning in sidelink vehicle to everything (V2X) system.

BACKGROUND ART

Wireless access systems have been widely deployed to provide various types of communication services such as voice or data. In general, a wireless access system is a multiple access system that supports communication of multiple users by sharing available system resources (a bandwidth, transmission power, etc.) among them. For example, multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, a Single Carrier Frequency Division Multiple Access (SC-FDMA) system and multi carrier frequency division multiple access (MC-FDMA) system, etc.

Sidelink (SL) refers to a communication scheme in which a direct link is established between user equipments (UEs) and the UEs directly exchange voice or data without intervention of a base station (BS). SL is considered as a solution of relieving the BS of the constraint of rapidly growing data traffic.

Vehicle-to-everything (V2X) is a communication technology in which a vehicle exchanges information with another vehicle, a pedestrian, and infrastructure by wired/wireless communication. V2X may be categorized into four types: vehicle-to-vehicle (V2V), vehicle-to-infrastructure (V2I), vehicle-to-network (V2N), and vehicle-to-pedestrian (V2P). V2X communication may be provided via a PC5 interface and/or a Uu interface.

As more and more communication devices demand larger communication capacities, there is a need for enhanced mobile broadband communication relative to existing RATs. Accordingly, a communication system is under discussion, for which services or UEs sensitive to reliability and latency are considered. The next-generation RAT in which eMBB, MTC, and URLLC are considered is referred to as new RAT or NR. In NR, V2X communication may also be supported.

FIG. 1 is a diagram illustrating V2X communication based on pre-NR RAT and V2X communication based on NR in comparison.

For V2X communication, a technique of providing safety service based on V2X messages such as basic safety message (BSM), cooperative awareness message (CAM), and decentralized environmental notification message (DENM) was mainly discussed in the pre-NR RAT. The V2X message may include location information, dynamic information, and attribute information. For example, a UE may transmit a CAM of a periodic message type and/or a DENM of an event-triggered type to another UE.

For example, the CAM may include basic vehicle information including dynamic state information such as a direction and a speed, vehicle static data such as dimensions, an external lighting state, path details, and so on. For example, the UE may broadcast the CAM which may have a latency less than 100 ms. For example, when an unexpected incident occurs, such as breakage or an accident of a vehicle, the UE may generate the DENM and transmit the DENM to another UE. For example, all vehicles within the transmission range of the UE may receive the CAM and/or the DENM. In this case, the DENM may have priority over the CAM.

In relation to V2X communication, various V2X scenarios are presented in NR. For example, the V2X scenarios include vehicle platooning, advanced driving, extended sensors, and remote driving.

For example, vehicles may be dynamically grouped and travel together based on vehicle platooning. For example, to perform platoon operations based on vehicle platooning, the vehicles of the group may receive periodic data from a leading vehicle. For example, the vehicles of the group may widen or narrow their gaps based on the periodic data.

For example, a vehicle may be semi-automated or full-automated based on advanced driving. For example, each vehicle may adjust a trajectory or maneuvering based on data obtained from a nearby vehicle and/or a nearby logical entity. For example, each vehicle may also share a dividing intention with nearby vehicles.

Based on extended sensors, for example, raw or processed data obtained through local sensor or live video data may be exchanged between vehicles, logical entities, terminals of pedestrians and/or V2X application servers. Accordingly, a vehicle may perceive an advanced environment relative to an environment perceivable by its sensor.

Based on remote driving, for example, a remote driver or a V2X application may operate or control a remote vehicle on behalf of a person incapable of driving or in a dangerous environment. For example, when a path may be predicted as in public transportation, cloud computing-based driving may be used in operating or controlling the remote vehicle. For example, access to a cloud-based back-end service platform may also be used for remote driving.

It is necessary to effectively provide control information related to positioning when UE-to-UE or UE-to-anchor node (AN) sidelink positioning is performed in an NR-V2X system.

Sidelink positioning is used for vehicle-to-vehicle positioning, reliable location information between vehicles need to be provided for vehicle safety, and positioning control information needs to be provided in consideration of various factors that affects positioning.

DISCLOSURE

Technical Problem

An object to be achieved with the present disclosure is to provide a method of transmitting control information for sidelink positioning and an apparatus therefor.

Another object to be achieved with the present disclosure is to provide a method of transmitting control information for sidelink positioning and an apparatus therefor for effectively providing sidelink positioning related control information based on a type of positioning, a structure of a slot for performing positioning, and the amount of information on positioning related SCI in an NR-V2X positioning system.

Another object to be achieved with the present disclosure is to provide a 2-stage PSCI resource allocation method for effectively transmitting positioning sidelink control information (PSCI) as control information for sidelink positioning in an NR-V2X positioning system.

Another object to be achieved with the present disclosure is to provide a method of effectively multiplexing and transmitting existing sidelink control information (SCI) for an existing NR-V2X service and PSCI for sidelink positioning.

Another object to be achieved with the present disclosure is to provide a method of transmitting control information for sidelink positioning and an apparatus therefor for minimizing collision between vehicular UEs and providing a safe positioning service with high reliability by effectively allocating positioning related control information, which increases along with support of various V2X operation modes such as broadcast, unicast, and groupcast and support of a feedback channel function, to a UE of a neighbor vehicle using a limited positioning resource.

Another object to be achieved with the present disclosure is to provide a 2-stage PSCI resource allocation method for adaptively dividing and transmitting PSCI to a physical sidelink control channel (PSCCH) and a physical sidelink shared channel (PSSCH) based on various positioning factors related to sidelink and (or) a type of control information for positioning.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solution

According to an aspect, a method of transmitting control information for sidelink positioning in an NR-V2X communication system includes determining at least one transmission slot for transmitting first positioning sidelink control information (PSCI) and second PSCI, determining at least one physical channel for transmitting the first PSCI and the second PSCI, mapping the first PSCI and the second PSCI to the at least one determined transmission slot and the at least one determined physical channel, and transmitting the mapped first PSCI and second PSCI.

According to an embodiment, the transmission slot may include an NR-V2X service slot and a positioning reference signal (PRS) slot.

According to an embodiment, the physical channel may include a physical sidelink control channel (PSCCH), a physical sidelink shared channel (PSSCH), an enhanced PSCCH (ePSCCH), and an enhanced PSSCH (ePSSCH).

According to an embodiment, the first PSCI and the second PSCI may be mapped to the different physical channels.

According to an embodiment, the first PSCI and the second PSCI may be mapped to the different physical channels in the one transmission slot, may be mapped to the different physical channels of the same type of the consecutive transmission slots, may be mapped to the different physical channels of the same type of the inconsecutive transmission slots, may be mapped to the different physical channels of the different types of the consecutive transmission slots, or may be mapped to the different physical channels of the different types of the inconsecutive transmission slots.

According to an embodiment, the transmission slot and the physical channel may be determined based on at least one of an amount of control information for positioning, a positioning method, a number of antenna groups to be used in positioning, or a type of positioning.

According to an embodiment, a resource allocation position of the second PSCI mapped to the transmission slot and the physical channel may be used for the first PSCI.

According to an embodiment, at least one of the mapped first PSCI or second PSCI may be interleaved and transmitted.

According to an aspect, an apparatus for transmitting control information for sidelink positioning includes a radio frequency (RF) transceiver, and a processor connected to the RF transceiver, wherein the processor may determine at least one transmission slot for transmitting first positioning sidelink control information (PSCI) and second PSCI, may determine at least one physical channel for transmitting the first PSCI and the second PSCI, may map the first PSCI and the second PSCI to the at least one determined transmission slot and the at least one determined physical channel, and may transmit the mapped first PSCI and second PSCI.

According to an embodiment, the transmission slot may include an NR-V2X service slot and a positioning reference signal (PRS) slot.

According to an embodiment, the physical channel may include a physical sidelink control channel (PSCCH), a physical sidelink shared channel (PSSCH), an enhanced PSCCH (ePSCCH), and an enhanced PSSCH (ePSSCH).

According to an embodiment, the first PSCI and the second PSCI may be mapped to the different physical channels.

According to an embodiment, the processor may map the first PSCI and the second PSCI to the different physical channels in the one transmission slot, to the different physical channels of the same type of the consecutive transmission slots, to the different physical channels of the same type of the inconsecutive transmission slots, to the different physical channels of the different types of the consecutive transmission slots, or to the different physical channels of the different types of the inconsecutive transmission slots.

According to an embodiment, the processor may determine the at least one transmission slot and the at least one physical channel for transmission of the first PSCI and the second PSCI based on at least one of an amount of control information for positioning, a positioning method, a number of antenna groups to be used in positioning, or a type of positioning.

According to an embodiment, a resource allocation position of the second PSCI mapped to the transmission slot and the physical channel may be used for the first PSCI.

According to an embodiment, the processor may interleave at least one of the mapped first PSCI or second PSCI.

Advantageous Effects

Various embodiments may advantageously provide a control information transmission method and an apparatus therefor for sidelink positioning.

Various embodiments may advantageously provide a control information transmission method for sidelink positioning and an apparatus therefor for effectively providing sidelink positioning related control information based on a type of positioning, a structure of a slot for performing positioning, and the amount of information on positioning related SCI in an NR-V2X positioning system.

Various embodiments may advantageously provide a 2-stage PSCI resource allocation method for effectively transmitting positioning sidelink control information (PSCI) as control information for sidelink positioning in an NR-V2X positioning system.

Various embodiments may advantageously provide a method of effectively multiplexing SCI for an existing NR-V2X service and PSCI for sidelink positioning.

Various embodiments may advantageously provide a method of transmitting control information for sidelink positioning and an apparatus therefor for minimizing collision between vehicular UEs and providing a safe positioning service with high reliability by effectively allocating positioning related control information, which increases along with support of various V2X operation modes such as broadcast, unicast, and groupcast and support of a feedback channel function, to a UE of a neighbor vehicle using a limited positioning resource.

Various embodiments may advantageously provide a 2-stage PSCI resource allocation method for adaptively dividing and transmitting PSCI to a physical sidelink control channel (PSCCH) and a physical sidelink shared channel (PSSCH) based on various positioning factors related to sidelink and (or) a type of control information for positioning.

It will be appreciated by persons skilled in the art that the effects that could be achieved with the present disclosure are not limited to what has been particularly described hereinabove and other advantages of the present disclosure will be more clearly understood from the following detailed description.

DESCRIPTION OF DRAWINGS

The accompanying drawings are provided to provide an understanding of the present disclosure, and are intended to illustrate various embodiments of the present disclosure and, together with the description of the specification, explain the principles of the present disclosure.

BEST MODE

Figure 1:
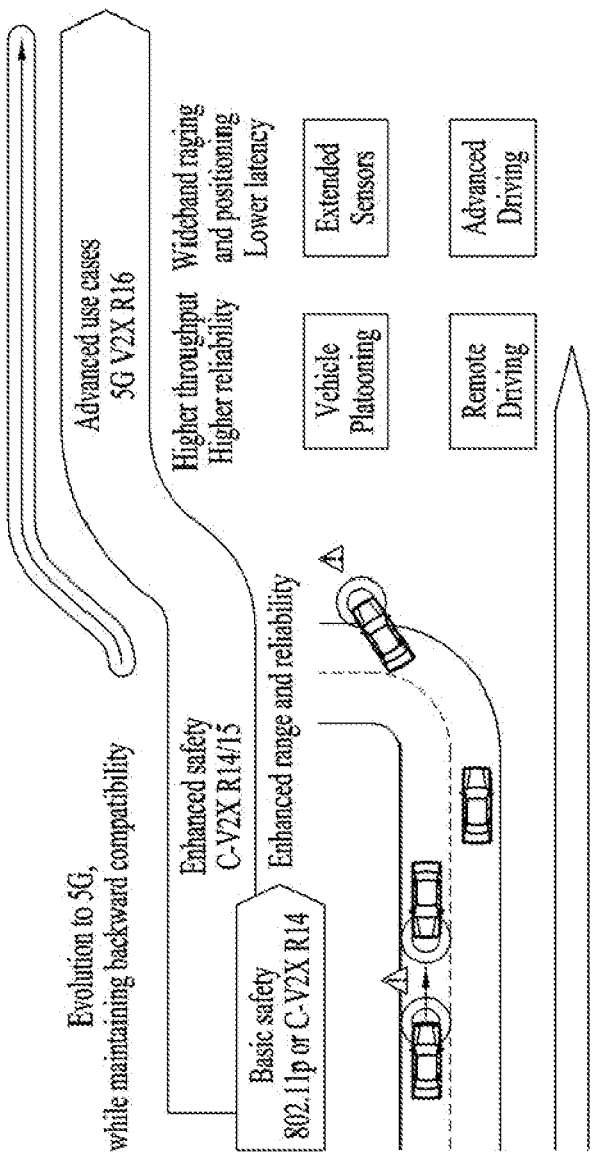
FIG. 1 is a diagram illustrating vehicle-to-everything (V2X) communication based on pre-new radio access technology (NR) RAT and V2X communication based on NR in comparison.

According to an aspect, a method of transmitting control information for sidelink positioning in an NR-V2X communication system includes determining at least one transmission slot for transmitting first positioning sidelink control information (PSCI) and second PSCI, determining at least one physical channel for transmitting the first PSCI and the second PSCI, mapping the first PSCI and the second PSCI to the at least one determined transmission slot and the at least one determined physical channel, and transmitting the mapped first PSCI and second PSCI.

[Mode]

A wireless communication system is a multiple access system that supports communication of multiple users by sharing available system resources (a bandwidth, transmission power, etc.). Examples of multiple access systems include a CDMA system, an FDMA system, a TDMA system, an OFDMA system, an SC-FDMA system, and an MC-FDMA system.

Sidelink (SL) refers to a communication scheme in which a direct link is established between user equipments (UEs) and the UEs directly exchange voice or data without intervention of a base station (BS). SL is considered as a solution of relieving the BS of the constraint of rapidly growing data traffic.

Vehicle-to-everything (V2X) is a communication technology in which a vehicle exchanges information with another vehicle, a pedestrian, and infrastructure by wired/wireless communication. V2X may be categorized into four types: vehicle-to-vehicle (V2V), vehicle-to-infrastructure (V2I), vehicle-to-network (V2N), and vehicle-to-pedestrian (V2P). V2X communication may be provided via a PC5 interface and/or a Uu interface.

As more and more communication devices demand larger communication capacities, there is a need for enhanced mobile broadband communication relative to existing RATs. Accordingly, a communication system is under discussion, for which services or UEs sensitive to reliability and latency are considered. The next-generation RAT in which eMBB, MTC, and URLLC are considered is referred to as new RAT or NR. In NR, V2X communication may also be supported.

Techniques described herein may be used in various wireless access systems such as code division multiple access (CDMA), frequency division multiple access (FDMA), time division multiple access (TDMA), orthogonal frequency division multiple access (OFDMA), single carrier-frequency division multiple access (SC-FDMA), and so on. CDMA may be implemented as a radio technology such as universal terrestrial radio access (UTRA) or CDMA2000. TDMA may be implemented as a radio technology such as global system for mobile communications (GSM)/general packet radio service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, evolved-UTRA (E-UTRA), or the like. IEEE 802.16m is an evolution of IEEE 802.16e, offering backward compatibility with an IRRR 802.16e-based system. UTRA is a part of universal mobile telecommunications system (UMTS). 3rd generation partnership project (3GPP) long term evolution (LTE) is a part of evolved UMTS (E-UMTS) using evolved UTRA (E-UTRA). 3GPP LTE employs OFDMA for downlink (DL) and SC-FDMA for uplink (UL). LTE-advanced (LTE-A) is an evolution of 3GPP LTE.

A successor to LTE-A, 5th generation (5G) new radio access technology (NR) is a new clean-state mobile communication system characterized by high performance, low latency, and high availability. 5G NR may use all available spectral resources including a low frequency band below 1 GHz, an intermediate frequency band between 1 GHz and 10 GHz, and a high frequency (millimeter) band of 24 GHz or above.

While the following description is given mainly in the context of LTE-A or 5G NR for the clarity of description, the technical idea of an embodiment of the present disclosure is not limited thereto.

Figure 2:
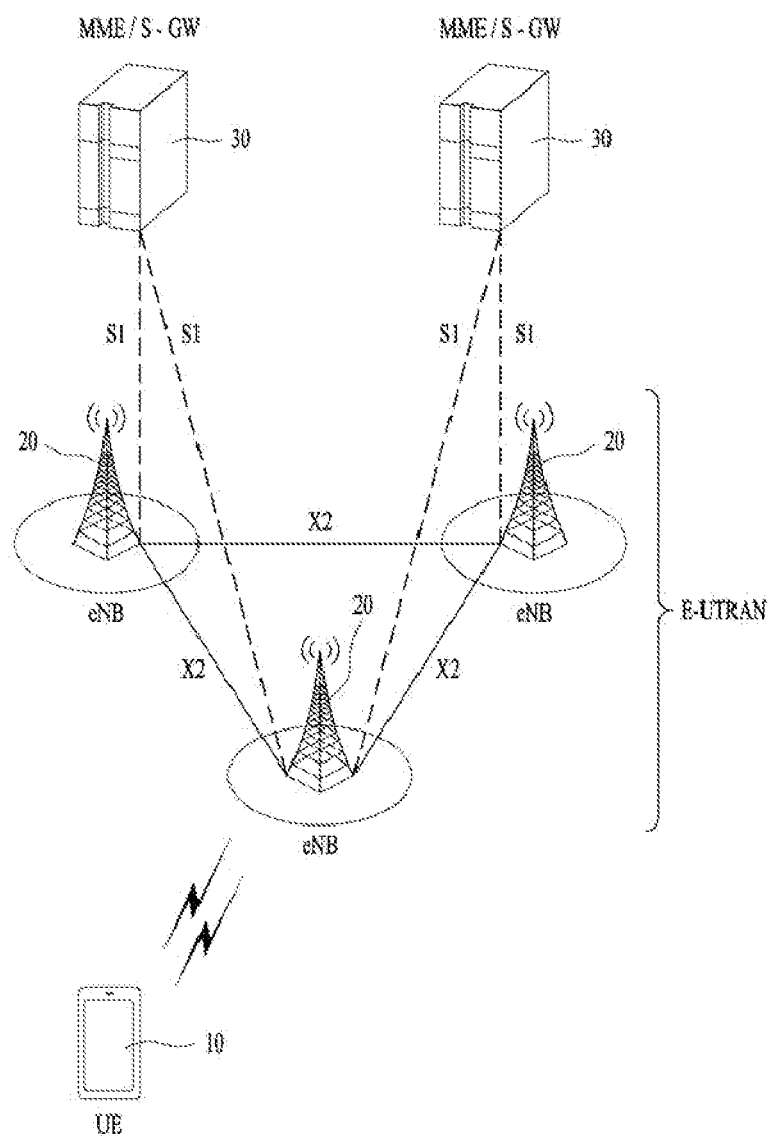
FIG. 2 is a diagram illustrating the structure of a long term evolution (LTE) system.

FIG. 2 illustrates the structure of an LTE system according to an embodiment of the present disclosure. This may also be called an evolved UMTS terrestrial radio access network (E-UTRAN) or LTE/LTE-A system.

Referring to FIG. 2, the E-UTRAN includes evolved Node Bs (eNBs) 20 which provide a control plane and a user plane to UEs 10. A UE 10 may be fixed or mobile, and may also be referred to as a mobile station (MS), user terminal (UT), subscriber station (SS), mobile terminal (MT), or wireless device. An eNB 20 is a fixed station communication with the UE 10 and may also be referred to as a base station (BS), a base transceiver system (BTS), or an access point.

eNBs 20 may be connected to each other via an X2 interface. An eNB 20 is connected to an evolved packet core (EPC) 39 via an S1 interface. More specifically, the eNB 20 is connected to a mobility management entity (MME) via an S1-MME interface and to a serving gateway (S-GW) via an S1-U interface.

The EPC 30 includes an MME, an S-GW, and a packet data network-gateway (P-GW). The MME has access information or capability information about UEs, which are mainly used for mobility management of the UEs. The S-GW is a gateway having the E-UTRAN as an end point, and the P-GW is a gateway having a packet data network (PDN) as an end point.

Based on the lowest three layers of the open system interconnection (OSI) reference model known in communication systems, the radio protocol stack between a UE and a network may be divided into Layer 1 (L1), Layer 2 (L2) and Layer 3 (L3). These layers are defined in pairs between a UE and an Evolved UTRAN (E-UTRAN), for data transmission via the Uu interface. The physical (PHY) layer at L1 provides an information transfer service on physical channels. The radio resource control (RRC) layer at L3 functions to control radio resources between the UE and the network. For this purpose, the RRC layer exchanges RRC messages between the UE and an eNB.

Figure 3:
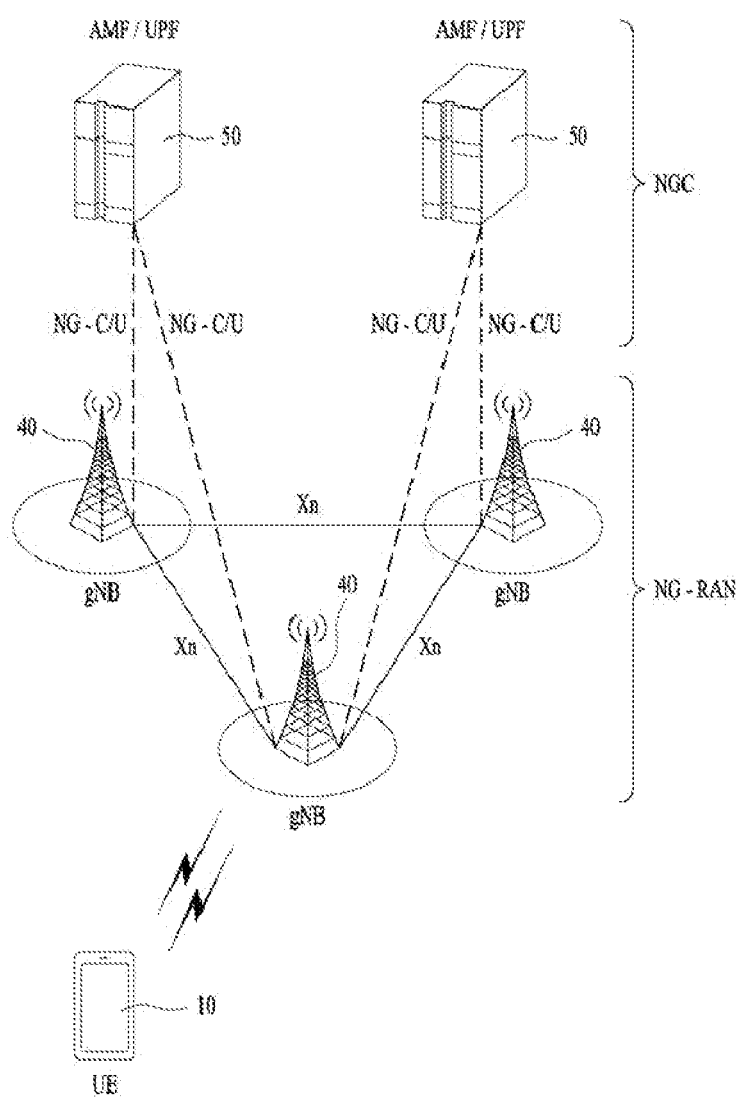
FIG. 3 is a diagram illustrating the structure of an NR system.

FIG. 3 illustrates the structure of an NR system

Referring to FIG. 3, a next generation radio access network (NG-RAN) may include a next generation Node B (gNB) and/or an eNB, which provides user-plane and control-plane protocol termination to a UE. In FIG. 3, the NG-RAN is shown as including only gNBs, by way of example. A gNB and an eNB are connected to each other via an Xn interface. The gNB and the eNB are connected to a 5G core network (5GC) via an NG interface. More specifically, the gNB and the eNB are connected to an access and mobility management function (AMF) via an NG-C interface and to a user plane function (UPF) via an NG-U interface.

Figure 4:
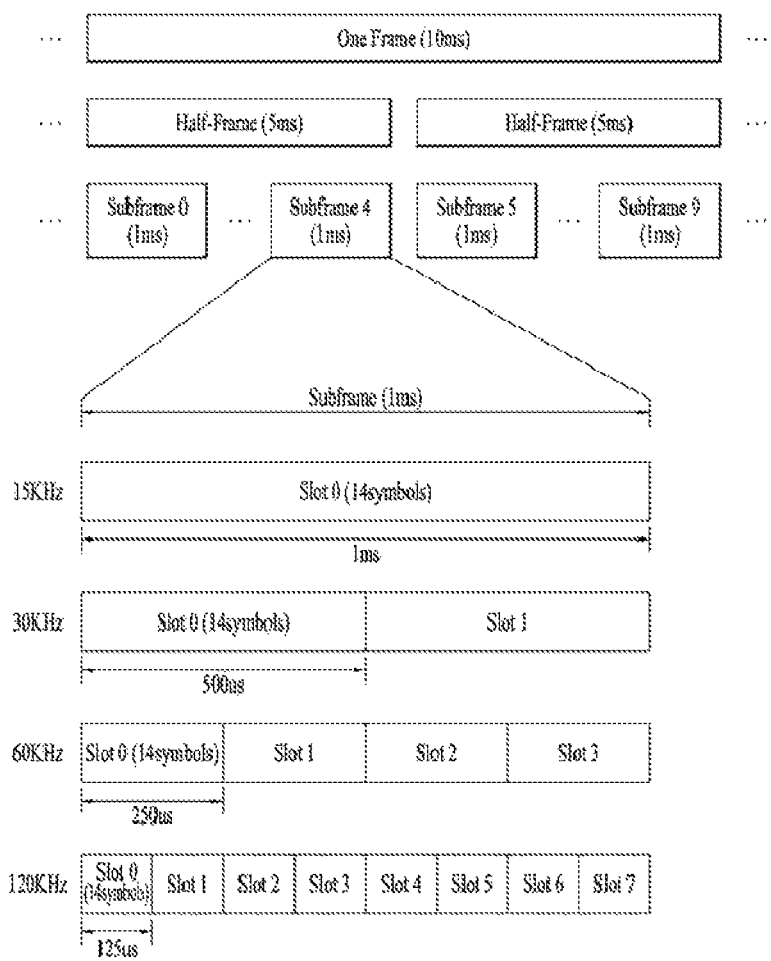
FIG. 4 is a diagram illustrating the structure of an NR radio frame.

FIG. 4 illustrates a radio frame structure in NR.

Referring to FIG. 4, a radio frame may be used for UL transmission and DL transmission in NR. A radio frame is 10 ms in length, and may be defined by two 5-ms half-frames. An HF may include five 1-ms subframes. A subframe may be divided into one or more slots, and the number of slots in an SF may be determined according to a subcarrier spacing (SCS). Each slot may include 12 or 14 OFDM(A) symbols according to a cyclic prefix (CP).

In a normal CP (NCP) case, each slot may include 14 symbols, whereas in an extended CP (ECP) case, each slot may include 12 symbols. Herein, a symbol may be an OFDM symbol (or CP-OFDM symbol) or an SC-FDMA symbol (or DFT-s-OFDM symbol).

Table 1 below lists the number of symbols per slot $N^{slot}_{symb}$, the number of slots per frame $N^{frame,u}_{slot}$, and the number of slots per subframe $N^{subframe,u}_{slot}$ according to an SCS configuration μ in the NCP case.

TABLE 1

| SCS (15*2u) | $N^{slot}_{symb}$ | $N^{frame, u}_{slot}$ | $N^{subframe, u}_{slot}$ |
|---|---|---|---|
| 15 KHz (u = 0) | 14 | 10 | 1 |

TABLE 1-continued

| SCS (15*2u) | $N^{slot}_{symb}$ | $N^{frame, u}_{slot}$ | $N^{subframe, u}_{slot}$ |
|---|---|---|---|
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

Table 2 below lists the number of symbols per slot, the number of slots per frame, and the number of slots per subframe according to an SCS in the ECP case.

TABLE 2

| SCS (15*2u) | $N^{slot}_{symb}$ | $N^{frame, u}_{slot}$ | $N^{subframe, u}_{slot}$ |
|---|---|---|---|
| 60 KHz (u = 2) | 12 | 40 | 4 |

In the NR system, different OFDM(A) numerologies (e.g., SCSs, CP lengths, and so on) may be configured for a plurality of cells aggregated for one UE. Accordingly, the (absolute time) duration of a time resource including the same number of symbols (e.g., a subframe, slot, or TTI) (collectively referred to as a time unit (TU) for convenience) may be configured to be different for the aggregated cells. In NR, various numerologies or SCSs may be supported to support various 5G services. For example, with an SCS of 15 kHz, a wide area in traditional cellular bands may be supported, while with an SCS of 30 kHz/60 kHz, a dense urban area, a lower latency, and a wide carrier bandwidth may be supported. With an SCS of 60 kHz or higher, a bandwidth larger than 24.25 GHz may be supported to overcome phase noise.

An NR frequency band may be defined by two types of frequency ranges, FR1 and FR2. The numerals in each frequency range may be changed. For example, the two types of frequency ranges may be given in [Table 3]. In the NR system, FR1 may be a "sub 6 GHz range" and FR2 may be an "above 6 GHz range" called millimeter wave (mmW).

TABLE 3

| Frequency Range designation | Corresponding frequency range | Subcarrier Spacing (SCS) |
|---|---|---|
| FR1 | 450 MHz-6000 MHz | 15, 30, 60 kHz |
| FR2 | 24250 MHz-52600 MHz | 60, 120, 240 kHz |

As mentioned above, the numerals in a frequency range may be changed in the NR system. For example, FR1 may range from 410 MHz to 7125 MHz as listed in [Table 4]. That is, FR1 may include a frequency band of 6 GHz (or 5850, 5900, and 5925 MHz) or above. For example, the frequency band of 6 GHz (or 5850, 5900, and 5925 MHz) or above may include an unlicensed band. The unlicensed band may be used for various purposes, for example, vehicle communication (e.g., autonomous driving).

TABLE 4

| Frequency Range designation | Corresponding frequency range | Subcarrier Spacing (SCS) |
|---|---|---|
| FR1 | 410 MHz-7125 MHz | 15, 30, 60 kHz |
| FR2 | 24250 MHz-52600 MHz | 60, 120, 240 kHz |

Figure 5:
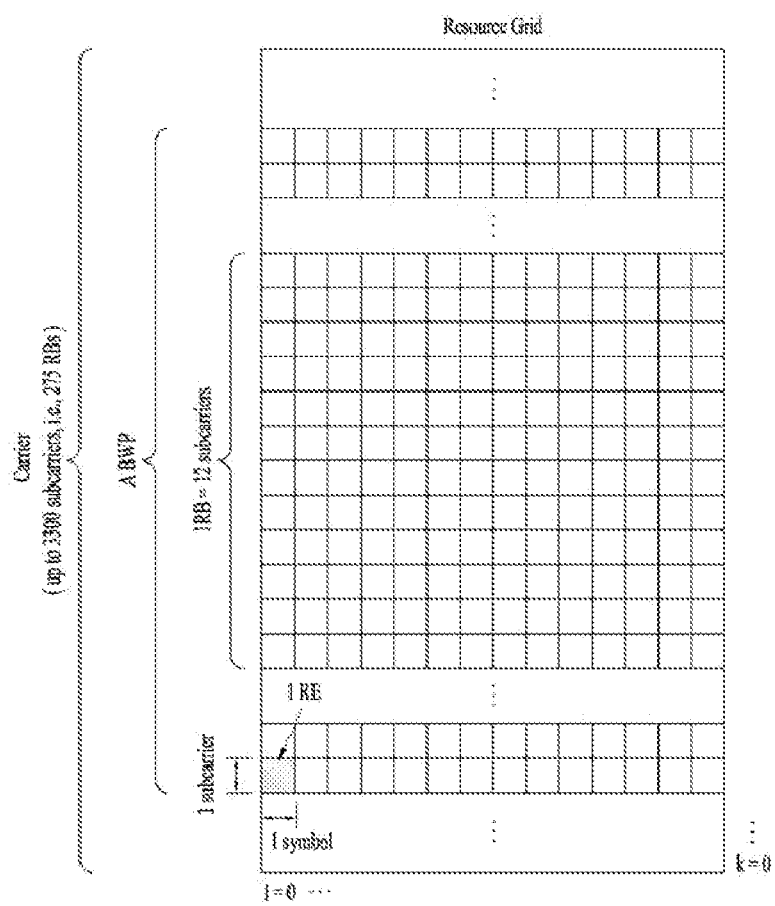
FIG. 5 is a diagram illustrating a slot structure in an NR frame.

FIG. 5 illustrates a slot structure in an NR frame.

Referring to FIG. 5, a slot includes a plurality of symbols in the time domain. For example, one slot may include 14 symbols in an NCP case and 12 symbols in an ECP case. Alternatively, one slot may include 7 symbols in an NCP case and 6 symbols in an ECP case.

A carrier includes a plurality of subcarriers in the frequency domain. An RB may be defined by a plurality of (e.g., 12) consecutive subcarriers in the frequency domain. A bandwidth part (BWP) may be defined by a plurality of consecutive (physical) RBs ((P)RBs) in the frequency domain and correspond to one numerology (e.g., SCS, CP length, or the like). A carrier may include up to N (e.g., 5) BWPs. Data communication may be conducted in an activated BWP. Each element may be referred to as a resource element (RE) in a resource grid, to which one complex symbol may be mapped.

A radio interface between UEs or a radio interface between a UE and a network may include L1, L2, and L3. In various embodiments of the present disclosure, L1 may refer to the PHY layer. For example, L2 may refer to at least one of the MAC layer, the RLC layer, the PDCH layer, or the SDAP layer. For example, L3 may refer to the RRC layer.

Now, a description will be given of sidelink (SL) communication.

Figure 6:
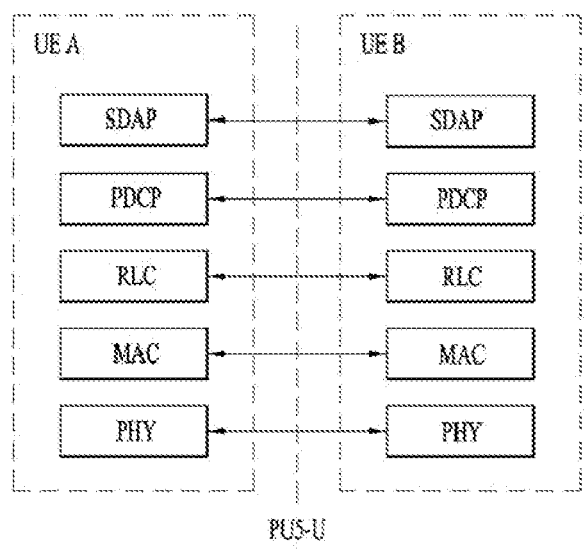
FIG. 6 is a diagram illustrating radio protocol architectures for sidelink (SL) communication.
Figure 6:
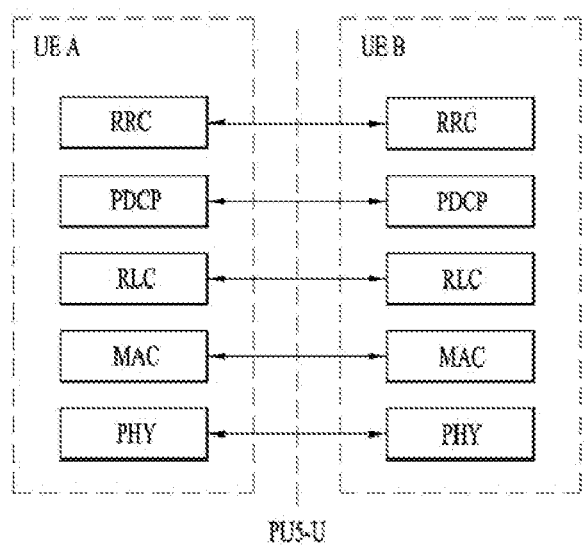

FIG. 6 illustrates a radio protocol architecture for SL communication Specifically, FIG. 6(a) illustrates a user-plane protocol stack in LTE, and FIG. 6(b) illustrates a control-plane protocol stack in LTE.

Sidelink synchronization signals (SLSSs) and synchronization information will be described below.

The SLSSs, which are SL-specific sequences, may include a primary sidelink synchronization signal (PSSS) and a secondary sidelink synchronization signal (SSSS). The PSSS may be referred to as a sidelink primary synchronization signal (S-PSS), and the SSSS may be referred to as a sidelink secondary synchronization signal (S-SSS). For example, length-127 M-sequences may be used for the S-PSS, and length-127 gold-sequences may be used for the S-SSS. For example, the UE may detect an initial signal and acquire synchronization by using the S-PSS. For example, the UE may acquire fine synchronization and detect a synchronization signal ID, by using the S-PSS and the S-SSS.

A physical sidelink broadcast channel (PSBCH) may be a (broadcast) channel carrying basic (system) information that the UE needs to first know before transmitting and receiving an SL signal. For example, the basic information may include information related to the SLSSs, duplex mode (DM) information, time division duplex (TDD) UL/DL (UL/DL) configuration information, resource pool-related information, information about the type of an application related to the SLSSs, subframe offset information, broadcast information, and so on. For example, the payload size of the PSBCH may be 56 bits, including a 24-bit cyclic redundancy check (CRC), for evaluation of PSBCH performance in NR V2X.

The S-PSS, S-SSS, and PSBCH may be included in a block format (e.g., SL synchronization signal (SL SS)/

PSBCH block, hereinafter, referred to as sidelink-synchronization signal block (S-SSB)) supporting periodic transmission. The S-SSB may have the same numerology (i.e., SCS and CP length) as a physical sidelink control channel (PSCCH)/physical sidelink shared channel (PSSCH) in a carrier, and the transmission bandwidth of the S-SSB may be within a (pre)configured SL BWP. For example, the bandwidth of the S-SSB may be 11 RBs. For example, the PSBCH may span 11 RBs. The frequency position of the S-SSB may be (pre)set. Therefore, the UE does not need to perform hypothesis detection in a frequency to discover the S-SSB in the carrier.

In the NR SL system, a plurality of numerologies including different SCSs and/or CP lengths may be supported. As an SCS increases, the length of a time resource for S-SSB transmission of a UE may be shortened. Accordingly, in order to ensure coverage of the S-SSB, a transmitting UE may transmit one or more S-SSBs to a receiving terminal within one S-SSB transmission period according to the SCS. For example, the number of S-SSBs that the transmitting terminal transmits to the receiving terminal within one S-SSB transmission period may be pre-configured or configured for the transmitting UE. For example, the S-SSB transmission period may be 160 ms. For example, for all SCSs, an S-SSB transmission period of 160 ms may be supported.

For example, when the SCS is 15 kHz in FR1, the transmitting UE may transmit one or two S-SSBs to the receiving UE within one S-SSB transmission period. For example, when the SCS is 30 kHz in FR1, the transmitting UE may transmit one or two S-SSBs to the receiving UE within one S-SSB transmission period. For example, when the SCS is 60 kHz in FR1, the transmitting UE may transmit one, two or four S-SSBs to the receiving UE within one S-SSB transmission period.

For example, when the SCS is 60 kHz in FR2, the transmitting UE may transmit 1, 2, 4, 8, 16, or 32 S-SSBs to the receiving UE within one S-SSB transmission period. For example, when the SCS is 120 kHz in FR2, the transmitting UE may transmit 1, 2, 4, 8, 16, 32, or 64 S-SSBs to the receiving UE within one S-SSB transmission period.

When the SCS is 60 kHz, two types of CPs may be supported. Further, the structure of an S-SSB transmitted by the transmitting UE to the receiving UE may be different according to a CP type. For example, the CP type may be an NCP or an ECP. Specifically, for example, when the CP type is NCP, the number of symbols to which the PSBCH is mapped in the S-SSB transmitted by the transmitting UE may be 9 or 8. On the other hand, for example, when the CP type is ECP, the number of symbols to which the PSBCH is mapped in the S-SSB transmitted by the transmitting UE may be 7 or 6. For example, the PSBCH may be mapped to the first symbol of the S-SSB transmitted by the transmitting UE. For example, upon receipt of the S-SSB, the receiving UE may perform an automatic gain control (AGC) operation in the first symbol period of the S-SSB.

Figure 7:
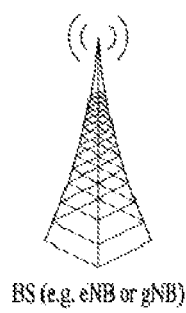
FIG. 7 is a diagram illustrating user equipments (UEs) which conduct V2X or SL communication between them
Figure 7:
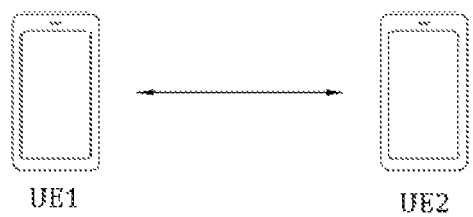

FIG. 7 illustrates UEs that conduct V2X or SL communication between them

Referring to FIG. 7, the term "UE" in V2X or SL communication may mainly refer to a terminal of a user. However, when network equipment such as a BS transmits and receives a signal according to a UE-to-UE communication scheme, the BS may also be regarded as a kind of UE. For example, a first UE (UE1) may be a first device 100 and a second UE (UE2) may be a second device 200.

For example, UE1 may select a resource unit corresponding to specific resources in a resource pool which is a set of resources. UE1 may then transmit an SL signal in the resource unit. For example, UE2, which is a receiving UE, may be configured with the resource pool in which UE1 may transmit a signal, and detect the signal from UE1 in the resource pool.

When UE1 is within the coverage of the BS, the BS may indicate the resource pool to UE1. On the contrary, when UE1 is outside the coverage of the BS, another UE may indicate the resource pool to UE1, or UE1 may use a predetermined resource pool.

In general, a resource pool may include a plurality of resource units, and each UE may select one or more resource units and transmit an SL signal in the selected resource units.

Figure 8:
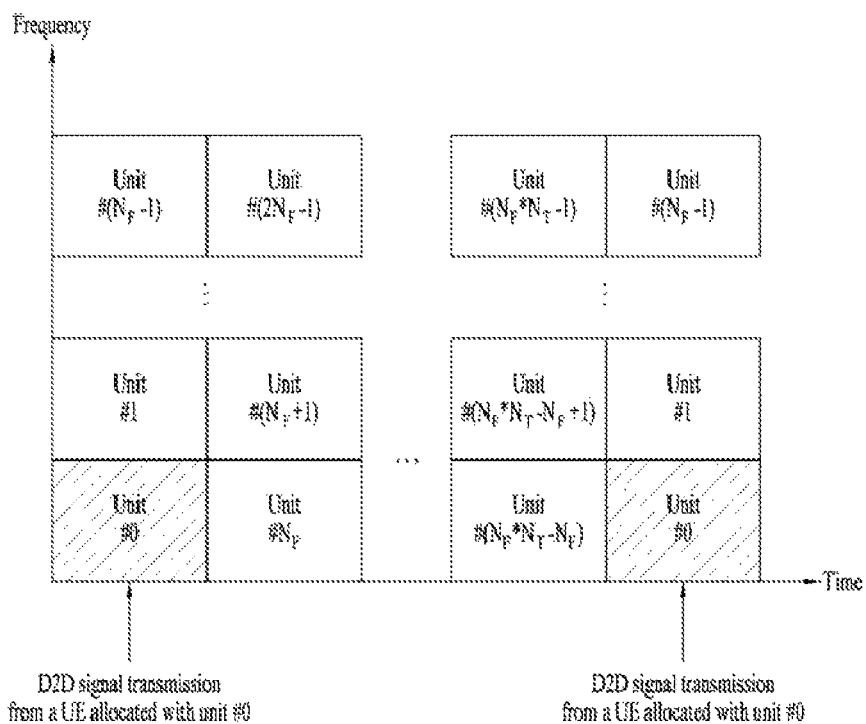
FIG. 8 is diagram illustrating resource units for V2X or SL communication

FIG. 8 illustrates resource units for V2X or SL communication.

Figure 13:
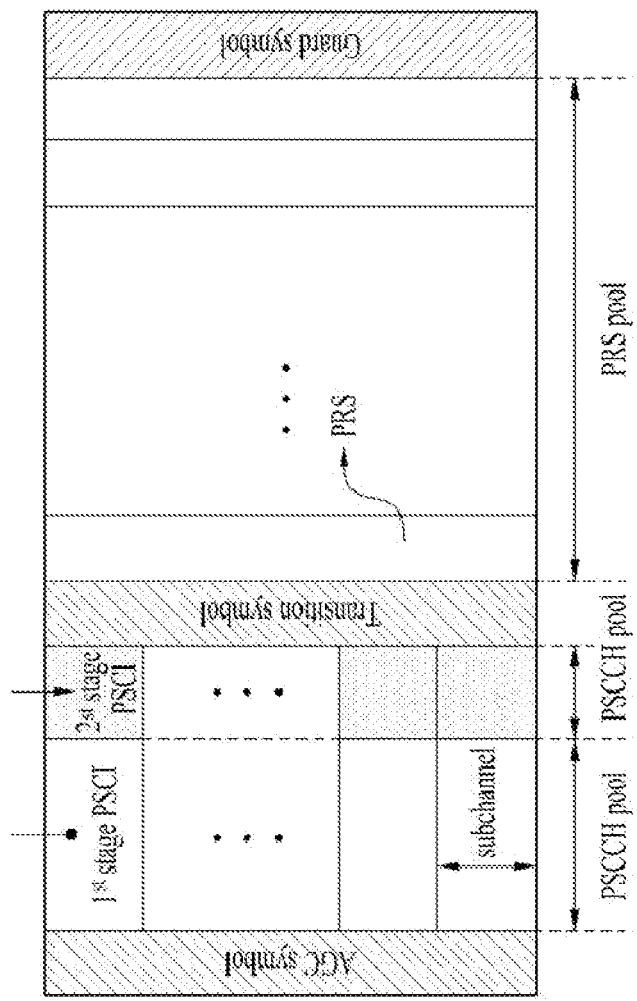
FIG. 13 is a diagram for explaining a positioning slot structure-1 according to an embodiment.

Referring to FIG. 8, the total frequency resources of a resource pool may be divided into NF frequency resources, and the total time resources of the resource pool may be divided into NT time resources. Thus, a total of NF*NT resource units may be defined in the resource pool. FIG. 13 illustrates an example in which the resource pool is repeated with a periodicity of NT subframes.

As illustrates in FIG. 8, one resource unit (e.g., Unit #0) may appear repeatedly with a periodicity. Alternatively, to achieve a diversity effect in the time or frequency domain, the index of a physical resource unit to which one logical resource unit is mapped may change over time in a predetermined pattern. In the resource unit structure, a resource pool may refer to a set of resource units available to a UE for transmission of an SL signal.

Resource pools may be divided into several types. For example, each resource pool may be classified as follows according to the content of an SL signal transmitted in the resource pool.

(1) A scheduling assignment (SA) may be a signal including information about the position of resources used for a transmitting UE to transmit an SL data channel, a modulation and coding scheme (MCS) or multiple input multiple output (MIMO) transmission scheme required for data channel demodulation, a timing advertisement (TA), and so on. The SA may be multiplexed with the SL data in the same resource unit, for transmission. In this case, an SA resource pool may refer to a resource pool in which an SA is multiplexed with SL data, for transmission. The SA may be referred to as an SL control channel.

(2) An SL data channel (PSSCH) may be a resource pool used for a transmitting UE to transmit user data. When an SA is multiplexed with SL data in the same resource unit, for transmission, only the SL data channel except for SA information may be transmitted in a resource pool for the SL data channel. In other words, REs used to transmit the SA information in an individual resource unit in an SA resource pool may still be used to transmit SL data in the resource pool of the SL data channel. For example, the transmitting UE may transmit the PSSCH by mapping the PSSCH to consecutive PRBs.

(3) A discovery channel may be a resource pool used for a transmitting UE to transmit information such as its ID. The transmitting UE may enable a neighboring UE to discover itself on the discovery channel.

Even when SL signals have the same contents as described above, different resource pools may be used according to the transmission/reception properties of the SL signals. For example, in spite of the same SL data channel or discovery message, a different resources pool may be used for an SL signal according to a transmission timing determination scheme for the SL signal (e.g., whether the SL signal is transmitted at a reception time of a synchronization reference signal (RS) or at a time resulting from applying a predetermined TA to the reception time), a resource allocation scheme for the SL signal (e.g., whether a BS allocates transmission resources of an individual signal to an individual transmitting UE or whether the individual transmitting UE selects its own individual signal transmission resources in the resource pool), the signal format of the SL signal (e.g., the number of symbols occupied by each SL signal in one subframe, or the number of subframes used for transmission of one SL signal), the strength of a signal from the BS, the transmission power of the SL UE, and so on.

Resource allocation in SL will be described below.

Figure 9:
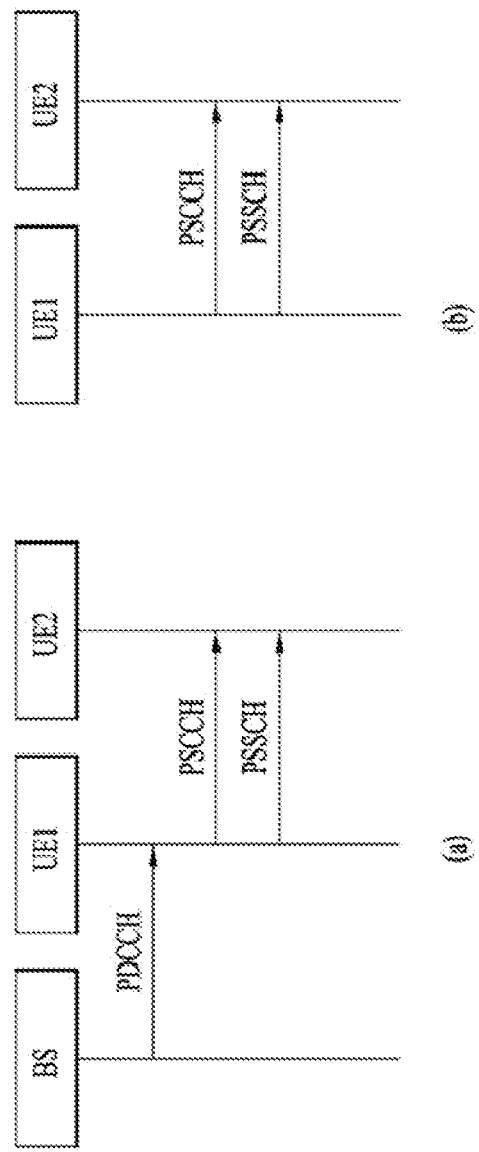
FIG. 9 is a diagram illustrating signal flows for V2X or SL communication procedures of a UE according to transmission modes

FIG. 9 illustrates a procedure of performing V2X or SL communication according to a transmission mode in a UE according to an embodiment of the present disclosure. In various embodiments of the present disclosure, a transmission mode may also be referred to as a mode or a resource allocation mode. For the convenience of description, a transmission mode in LTE may be referred to as an LTE transmission mode, and a transmission mode in NR may be referred to as an NR resource allocation mode.

For example, FIG. 9 (a) illustrates a UE operation related to LTE transmission mode 1 or LTE transmission mode 3. Alternatively, for example, FIG. 9 (a) illustrates a UE operation related to NR resource allocation mode 1. For example, LTE transmission mode 1 may be applied to general SL communication, and LTE transmission mode 3 may be applied to V2X communication.

For example, FIG. 9 (b) illustrates a UE operation related to LTE transmission mode 2 or LTE transmission mode 4. Alternatively, for example, FIG. 9 (b) illustrates a UE operation related to NR resource allocation mode 2.

Referring to FIG. 9 (a), in LTE transmission mode 1, LTE transmission mode 3, or NR resource allocation mode 1, a BS may schedule SL resources to be used for SL transmission of a UE. For example, the BS may perform resource scheduling for UE1 through a PDCCH (more specifically, DL control information (DCI)), and UE1 may perform V2X or SL communication with UE2 according to the resource scheduling. For example, UE1 may transmit sidelink control information (SCI) to UE2 on a PSCCH, and then transmit data based on the SCI to UE2 on a PSSCH.

For example, in NR resource allocation mode 1, a UE may be provided with or allocated resources for one or more SL transmissions of one transport block (TB) by a dynamic grant from the BS. For example, the BS may provide the UE with resources for transmission of a PSCCH and/or a PSSCH by the dynamic grant. For example, a transmitting UE may report an SL hybrid automatic repeat request (SL HARQ) feedback received from a receiving UE to the BS. In this case, PUCCH resources and a timing for reporting the SL HARQ feedback to the BS may be determined based on an indication in a PDCCH, by which the BS allocates resources for SL transmission.

For example, the DCI may indicate a slot offset between the DCI reception and a first SL transmission scheduled by the DCI. For example, a minimum gap between the DCI that schedules the SL transmission resources and the resources of the first scheduled SL transmission may not be smaller than a processing time of the UE.

For example, in NR resource allocation mode 1, the UE may be periodically provided with or allocated a resource set for a plurality of SL transmissions through a configured grant from the BS. For example, the grant to be configured may include configured grant type 1 or configured grant type 2. For example, the UE may determine a TB to be transmitted in each occasion indicated by a given configured grant.

For example, the BS may allocate SL resources to the UE in the same carrier or different carriers.

For example, an NR gNB may control LTE-based SL communication. For example, the NR gNB may transmit NR DCI to the UE to schedule LTE SL resources. In this case, for example, a new RNTI may be defined to scramble the NR DCI. For example, the UE may include an NR SL module and an LTE SL module.

For example, after the UE including the NR SL module and the LTE SL module receives NR SL DCI from the gNB, the NR SL module may convert the NR SL DCI into LTE DCI type 5A, and transmit LTE DCI type 5A to the LTE SL module every Xms. For example, after the LTE SL module receives LTE DCI format 5A from the NR SL module, the LTE SL module may activate and/or release a first LTE subframe after Z ms. For example, X may be dynamically indicated by a field of the DCI. For example, a minimum value of X may be different according to a UE capability. For example, the UE may report a single value according to its UE capability. For example, X may be positive.

Referring to FIG. 9 (b), in LTE transmission mode 2, LTE transmission mode 4, or NR resource allocation mode 2, the UE may determine SL transmission resources from among SL resources preconfigured or configured by the BS/network. For example, the preconfigured or configured SL resources may be a resource pool. For example, the UE may autonomously select or schedule SL transmission resources. For example, the UE may select resources in a configured resource pool on its own and perform SL communication in the selected resources. For example, the UE may select resources within a selection window on its own by a sensing and resource (re)selection procedure. For example, the sensing may be performed on a subchannel basis. UE1, which has autonomously selected resources in a resource pool, may transmit SCI to UE2 on a PSCCH and then transmit data based on the SCI to UE2 on a PSSCH.

For example, a UE may help another UE with SL resource selection. For example, in NR resource allocation mode 2, the UE may be configured with a grant configured for SL transmission. For example, in NR resource allocation mode 2, the UE may schedule SL transmission for another UE. For example, in NR resource allocation mode 2, the UE may reserve SL resources for blind retransmission.

For example, in NR resource allocation mode 2, UE1 may indicate the priority of SL transmission to UE2 by SCI. For example, UE2 may decode the SCI and perform sensing and/or resource (re)selection based on the priority. For example, the resource (re)selection procedure may include identifying candidate resources in a resource selection window by UE2 and selecting resources for (re)transmission from among the identified candidate resources by UE2. For example, the resource selection window may be a time interval during which the UE selects resources for SL transmission. For example, after UE2 triggers resource (re)selection, the resource selection window may start at T1≥0, and may be limited by the remaining packet delay budget of UE2. For example, when specific resources are indicated by the SCI received from UE1 by the second UE and an L1 SL reference signal received power (RSRP) measurement of the specific resources exceeds an SL RSRP threshold in the step of identifying candidate resources in the resource selection window by UE2, UE2 may not determine the specific resources as candidate resources. For example, the SL RSRP threshold may be determined based on the priority of SL transmission indicated by the SCI received from UE1 by UE2 and the priority of SL transmission in the resources selected by UE2.

For example, the L1 SL RSRP may be measured based on an SL demodulation reference signal (DMRS). For example, one or more PSSCH DMRS patterns may be configured or preconfigured in the time domain for each resource pool. For example, PDSCH DMRS configuration type 1 and/or type 2 may be identical or similar to a PSSCH DMRS pattern in the frequency domain. For example, an accurate DMRS pattern may be indicated by the SCI. For example, in NR resource allocation mode 2, the transmitting UE may select a specific DMRS pattern from among DMRS patterns configured or preconfigured for the resource pool.

For example, in NR resource allocation mode 2, the transmitting UE may perform initial transmission of a TB without reservation based on the sensing and resource (re)selection procedure. For example, the transmitting UE may reserve SL resources for initial transmission of a second TB using SCI associated with a first TB based on the sensing and resource (re)selection procedure.

For example, in NR resource allocation mode 2, the UE may reserve resources for feedback-based PSSCH retransmission through signaling related to a previous transmission of the same TB. For example, the maximum number of SL resources reserved for one transmission, including a current transmission, may be 2, 3 or 4. For example, the maximum number of SL resources may be the same regardless of whether HARQ feedback is enabled. For example, the maximum number of HARQ (re)transmissions for one TB may be limited by a configuration or preconfiguration. For example, the maximum number of HARQ (re)transmissions may be up to 32. For example, if there is no configuration or preconfiguration, the maximum number of HARQ (re)transmissions may not be specified. For example, the configuration or preconfiguration may be for the transmitting UE. For example, in NR resource allocation mode 2, HARQ feedback for releasing resources which are not used by the UE may be supported.

For example, in NR resource allocation mode 2, the UE may indicate one or more subchannels and/or slots used by the UE to another UE by SCI. For example, the UE may indicate one or more subchannels and/or slots reserved for PSSCH (re)transmission by the UE to another UE by SCI. For example, a minimum allocation unit of SL resources may be a slot. For example, the size of a subchannel may be configured or preconfigured for the UE.

SCI will be described below.

While control information transmitted from a BS to a UE on a PDCCH is referred to as DCI, control information transmitted from one UE to another UE on a PSCCH may be referred to as SCI. For example, the UE may know the starting symbol of the PSCCH and/or the number of symbols in the PSCCH before decoding the PSCCH. For example, the SCI may include SL scheduling information. For example, the UE may transmit at least one SCI to another UE to schedule the PSSCH. For example, one or more SCI formats may be defined.

For example, the transmitting UE may transmit the SCI to the receiving UE on the PSCCH. The receiving UE may decode one SCI to receive the PSSCH from the transmitting UE.

For example, the transmitting UE may transmit two consecutive SCIs (e.g., 2-stage SCI) on the PSCCH and/or PSSCH to the receiving UE. The receiving UE may decode the two consecutive SCIs (e.g., 2-stage SCI) to receive the PSSCH from the transmitting UE. For example, when SCI configuration fields are divided into two groups in consideration of a (relatively) large SCI payload size, SCI including a first SCI configuration field group is referred to as first SCI. SCI including a second SCI configuration field group may be referred to as second SCI. For example, the transmitting UE may transmit the first SCI to the receiving UE on the PSCCH. For example, the transmitting UE may transmit the second SCI to the receiving UE on the PSCCH and/or PSSCH. For example, the second SCI may be transmitted to the receiving UE on an (independent) PSCCH or on a PSSCH in which the second SCI is piggybacked to data. For example, the two consecutive SCIs may be applied to different transmissions (e.g., unicast, broadcast, or groupcast).

For example, the transmitting UE may transmit all or part of the following information to the receiving UE by SCI. For example, the transmitting UE may transmit all or part of the following information to the receiving UE by first SCI and/or second SCI.

PSSCH-related and/or PSCCH-related resource allocation information, for example, the positions/number of time/frequency resources, resource reservation information (e.g. a periodicity), and/or

- an SL channel state information (CSI) report request indicator or SL (L1) RSRP (and/or SL (L1) reference signal received quality (RSRQ) and/or SL (L1) received signal strength indicator (RSSI)) report request indicator, and/or
- an SL CSI transmission indicator (on PSSCH) (or SL (L1) RSRP (and/or SL (L1) RSRQ and/or SL (L1) RSSI) information transmission indicator), and/or MCS information, and/or
transmission power information, and/or
L1 destination ID information and/or L1 source ID information, and/or
SL HARQ process ID information, and/or
new data indicator (NDI) information, and/or
redundancy version (RV) information, and/or
QoS information (related to transmission traffic/packet), for example, priority information, and/or

- An SL CSI-RS transmission indicator or information about the number of SL CSI-RS antenna ports (to be transmitted);
- Location information about a transmitting UE or location (or distance area) information about a target receiving UE (requested to transmit an SL HARQ feedback), and/or
- RS (e.g., DMRS or the like) information related to decoding and/or channel estimation of data transmitted on a PSSCH, for example, information related to a pattern of (time-frequency) mapping resources of the DMRS, rank information, and antenna port index information.

For example, the first SCI may include information related to channel sensing. For example, the receiving UE may decode the second SCI using the PSSCH DMRS. A polar code used for the PDCCH may be applied to the second SCI. For example, the payload size of the first SCI may be equal for unicast, groupcast and broadcast in a resource pool. After decoding the first SCI, the receiving UE does not need to perform blind decoding on the second SCI. For example, the first SCI may include scheduling information about the second SCI.

In various embodiments of the present disclosure, since the transmitting UE may transmit at least one of the SCI, the first SCI, or the second SCI to the receiving UE on the PSCCH, the PSCCH may be replaced with at least one of the SCI, the first SCI, or the second SC. Additionally or alternatively, for example, the SCI may be replaced with at least one of the PSCCH, the first SCI, or the second SCI. Additionally or alternatively, for example, since the transmitting UE may transmit the second SCI to the receiving UE on the PSSCH, the PSSCH may be replaced with the second SCI.

Hereinafter, acquisition of synchronization of a SL UE will be described.

In time division multiple access (TDMA) and frequency division multiples access (FDMA) systems, accurate time and frequency synchronization may be required. When the time and frequency synchronization are not accurate, system performance may be degraded due to inter symbol interference (ISI) and inter carrier interference (ICI). This is also applied to V2X in the same way. In V2X, for time/frequency synchronization, a sidelink (SL) synchronization signal (SLSS) may be used in physical layer, and a master information block-sidelink-V2X (MIB-SL-V2X) may be used in a radio link control (RLC) layer.

Tx/Rx Beam Sweep

When a very high frequency is used as in mmWave, beamforming may be generally used to overcome high pathloss. In order to use beamforming, first, the best beam pair needs to be detected among several beam pairs between a transmitting end and a receiving end. This process may be referred to as beam acquisition or beam tracking or beam tracking in terms of the receiving end. In particular, in mmWave, analog beamforming is used, and thus a vehicle needs to perform beam sweeping for switching beams in different directions at different times using an antenna array of the vehicle itself during the beam acquisition or the beam tracking.

Multiple Active Sidelink BWPs

In NR V2X, communication through support of a plurality of BWPs (i.e., support of a plurality of configured sidelink BWPs and/or support of a plurality of active sidelink BWPs) may be considered. This may be for supporting different numerologies or heterogeneous services/communications that require parameters and/or requirements or may also be for ICI reduction due to a reduced CP length.

Figure 10:
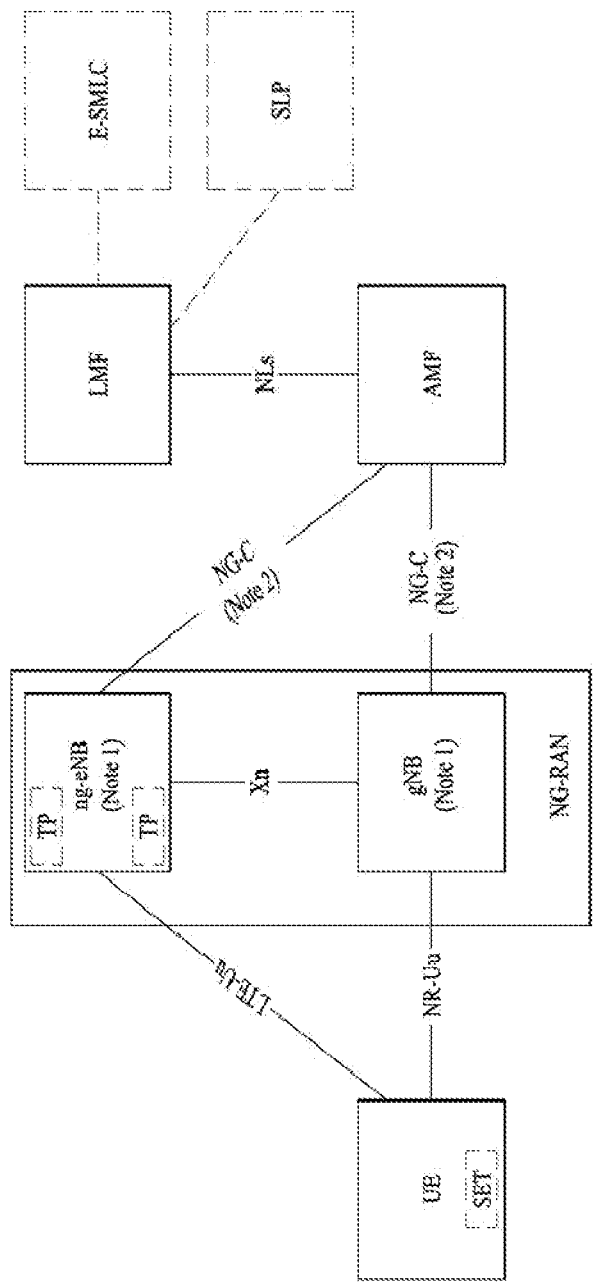
FIG. 10 illustrates an exemplary architecture of a 5G system capable of positioning a UE connected to an NG-RAN or an E-UTRAN according to an embodiment of the present disclosure.

FIG. 10 illustrates an exemplary architecture of a 5G system capable of positioning a UE connected to an NG-RAN or an E-UTRAN according to an embodiment of the present disclosure.

Referring to FIG. 10, an AMF may receive a request for a location service related to a specific target UE from another entity such as a gateway mobile location center (GMLC) or may autonomously determine to initiate the location service on behalf of the specific target UE. The AMF may then transmit a location service request to a location management function (LMF). Upon receipt of the location service request, the LMF may process the location service request and return a processing result including information about an estimated location of the UE to the AMF. On the other hand, when the location service request is received from another entity such as the GMLC, the AMF may deliver the processing result received from the LMF to the other entity.

A new generation evolved-NB (ng-eNB) and a gNB, which are network elements of an NG-RAN capable of providing measurement results for positioning, may measure radio signals for the target UE and transmit result values to the LMF. The ng-eNB may also control some transmission points (TPs) such as remote radio heads or positioning reference signal (PRS)-dedicated TPs supporting a PRS-based beacon system for an E-UTRA.

The LMF is connected to an enhanced serving mobile location center (E-SMLC), and the E-SMLC may enable the LMF to access an E-UTRAN. For example, the E-SMLC may enable the LMF to support observed time difference of arrival (OTDoA), which is one of positioning methods in the E-UTRAN, by using DL measurements obtained by the target UE through signals transmitted by the eNB and/or the PRS-dedicated TPs in the E-UTRAN.

The LMF may be connected to an SUPL location platform (SLP). The LMF may support and manage different location determination services for target UEs. The LMF may interact with the serving ng-eNB or serving gNB of a target UE to obtain a location measurement of the UE. For positioning the target UE, the LMF may determine a positioning method based on a location service (LCS) client type, a QoS requirement, UE positioning capabilities, gNB positioning capabilities, and ng-eNB positioning capabilities, and apply the positioning method to the serving gNB and/or the serving ng-eNB. The LMF may determine additional information such as a location estimate for the target UE and the accuracy of the position estimation and a speed. The SLP is a secure user plane location (SUPL) entity responsible for positioning through the user plane.

The UE may measure a DL signal through sources such as the NG-RAN and E-UTRAN, different global navigation satellite systems (GNSSes), a terrestrial beacon system (TBS), a wireless local area network (WLAN) access point, a Bluetooth beacon, and a UE barometric pressure sensor. The UE may include an LCS application and access the LCS application through communication with a network to which the UE is connected or through another application included in the UE. The LCS application may include a measurement and calculation function required to determine the location of the UE. For example, the UE may include an independent positioning function such as a global positioning system (GPS) and report the location of the UE independently of an NG-RAN transmission. The independently obtained positioning information may be utilized as auxiliary information of positioning information obtained from the network.

Figure 11:
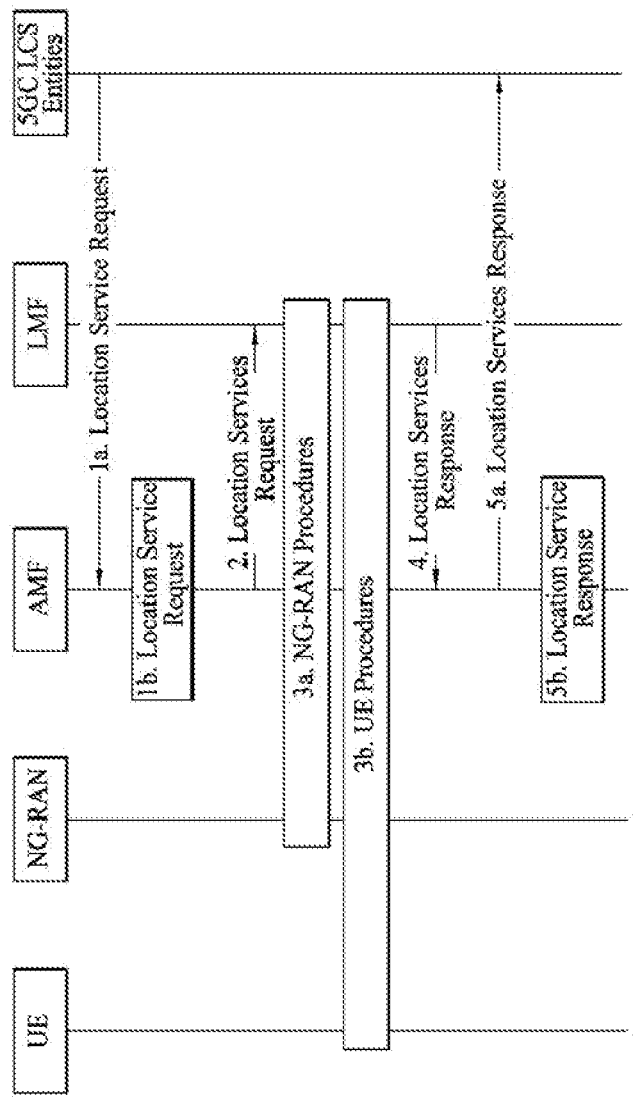
FIG. 11 illustrates exemplary implementation of a network for positioning a UE according to an embodiment of the present disclosure.

FIG. 11 illustrates exemplary implementation of a network for positioning a UE according to an embodiment of the present disclosure.

Upon receipt of a location service request when the UE is in a connection management-IDLE (CM-IDLE) state, the AMF may establish a signaling connection with the UE and request a network trigger service to assign a specific serving gNB or ng-eNB. This operation is not shown in FIG. 11. That is, FIG. 11 may be based on the assumption that the UE is in connected mode. However, the signaling connection may be released by the NG-RAN due to signaling and data deactivation during positioning.

Referring to FIG. 11, a network operation for positioning a UE will be described in detail. In step 1a, a 5GC entity such as a GMLC may request a location service for positioning a target UE to a serving AMF. However, even though the GMLC does not request the location service, the serving AMF may determine that the location service for positioning the target UE is required in step 1b. For example, for positioning the UE for an emergency call, the serving AMF may determine to perform the location service directly.

The AMF may then transmit a location service request to an LMF in step 2, and the LMF may start location procedures with the serving-eNB and the serving gNB to obtain positioning data or positioning assistance data in step 3a. Additionally, the LMF may initiate a location procedure for DL positioning with the UE in step 3b. For example, the LMF may transmit positioning assistance data (assistance data defined in 3GPP TS 36.355) to the UE, or obtain a location estimate or location measurement. Although step 3b may be additionally performed after step 3a, step 3b may be performed instead of step 3a.

Figure 24:
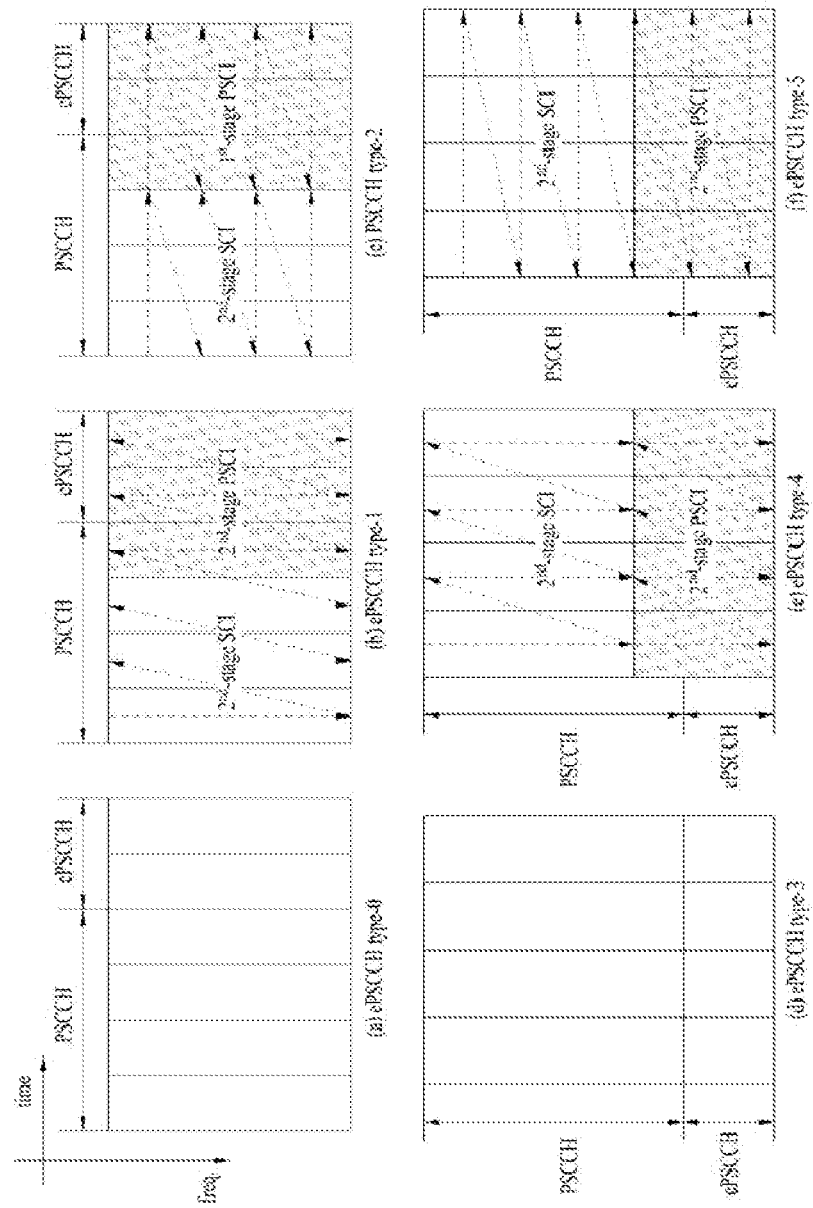
FIG. 24 is a diagram for explaining a resource allocation method for transmission of $2^{nd}$-stage PSCI on a PSSCH and an ePSSCH according to an embodiment.

In step 4, the LMF may provide a location service response to the AMF. The location service response may include information indicating whether location estimation of the UE was successful and the location estimate of the UE. Then, when the procedure of FIG. 24 is initiated in step 1a, the AMF may deliver the location service response to the 5GC entity such as the GMLC. When the procedure of FIG. 24 is initiated in step 1b, the AMF may use the location service response to provide the location service related to an emergency call or the like.

Embodiment 1

Figure 12:
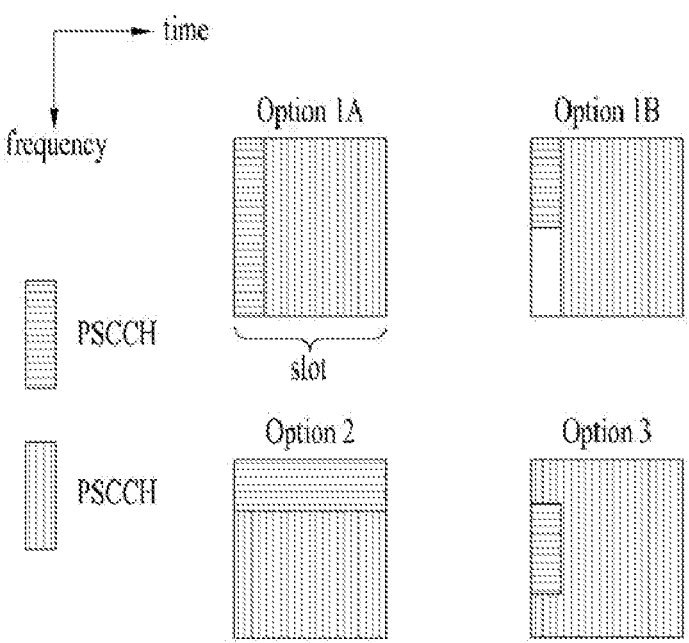
FIG. 12 is a diagram for explaining a 2-stage SCI structure for an NR-V2X service.

FIG. 12 is a diagram for explaining a 2-stage SCI structure for an NR-V2X service.

In NR-V2X, a multiplexing method of various PSCCHs and PSSCHs according to a condition such as latency coverage of information transmitted when UE-to-UE communication is performed is considered.

Referring to FIG. 12, a multiplexing option of a PSCCH and a PSSCH, which is currently discussed in 3GPP Rel. 16 NR V2X, may include 1) a form in which the PSCCH and the PSSCH are time division multiplexed (TDM) in one slot as shown in option 1A/1B and option 3, 2) a form in which the PSCCH and the PSSCH are frequency division multiplexed (FDM) as shown in in option 2, and 3) a form in which the PSSCH is FDM with the PSCCH only in some symbols as shown in option 3.

Options of FIG. 12 will be described below in detail.

Multiplexing of PSCCH and the associated PSSCH (here, the "associated" means that the PSCCH at least carries information necessary to decode the PSSCH).

Option 1: PSCCH and the associated PSSCH are transmitted using non-overlapping time resources.

Option 1A: The frequency resources used by the two channels are the same.

Option 1B: The frequency resources used by the two channels can be different.

Option 2: PSCCH and the associated PSSCH are transmitted using non-overlapping frequency resources in the all the time resources used for transmission. The time resources used by the two channels are the same.

Option 3: A part of PSCCH and the associated PSSCH are transmitted using overlapping time resources in non-overlapping frequency resources, but another part of the associated PSSCH and/or another part of the PSCCH are transmitted using non-overlapping time resources.

In each option of FIG. 12, one radio resource may include at least one subchannel (frequency axis) and at least one time unit (time axis). In this case, the subchannel may include one or more consecutive resource blocks (RBs) or may include a specific number of consecutive subcarriers. The time unit may be a subframe, a transmission time interval (TTI), a slot, an OFDM/OFDMA symbol, or an SC-FDM/SC-FDMA symbol.

In contrast, the 2-stage SCI structure for improving the transmission efficiency of the PSCCH may be applied only to SCI transmission related to an NR-V2X service and is not considered at all for transmission of positioning sidelink control information (PSCI) that is SCI related to positioning required to perform sidelink positioning. Thus, there has been a need for an effective 2-stage PSCI operation method in consideration of various sidelink positioning types and positioning slot structures based on the 2-stage SCI structure of FIG. 12.

According to the following embodiments, various 2-stage PSCI operation methods for sidelink positioning will be described below.

First, an example of 2-stage PSCI information mapping applicable to embodiments of the present disclosure will be described.

PSCI according to an embodiment may be divided into $1^{st}$ stage PSCI and $2^{nd}$ stage PSCI.

PSCI according to another embodiment may be defined more subdivided than two stages.

The $1^{st}$ stage PSCI may include information on a positioning method, information on the number of antenna groups used in positioning, information on a positioning operation (type), and information on a positioning related SCI position. For example, the $1^{st}$ stage PSCI may include positioning related control information that is commonly used in all UEs, some UEs, or a specific UE.

The $2^{nd}$ stage PSCI may be dynamically determined based on the $1^{st}$ stage PSCI.

For example, the $2^{nd}$ stage PSCI may include detailed control information required to perform a positioning method and (or) a positioning operation.

The information on the positioning method included in the $1^{st}$ stage PSCI may be indicated by a UE (a positioning UE) that requests to perform positioning using a predetermined indicator indicating a positioning method and (or) a neighboring UE that participates in positioning.

For example, the positioning method may include a time difference of arrival (TDoA) positioning method, a round trip time (RTT) positioning method, an uplink time difference of arrival (UTDoA) positioning method, and an angle of arrival (AoA) positioning method, but is not limited thereto, and a specific positioning method may also be added according to a design of one of ordinary skill in the art.

The information on the number of antenna groups used in positioning may include information on the number of antenna groups used in positioning when the UE includes a plurality of antenna groups like a distributed antenna system. In this case, each antenna group may include one or more antenna elements.

The information on the positioning related SCI position may indicate an SCI structure operated in positioning. For example, the information on the positioning related SCI position may include information on whether the $2^{nd}$ stage PSCI is present after the $1^{st}$ stage PSCI, information on whether the $2^{nd}$ stage PSCI is present in the same slot as that of the $1^{st}$ stage PSCI, and information on a point of a corresponding slot, in which corresponding PSCI is positioned, when SCI for positioning, i.e., PSCI is multiplexed and transmitted in the same slot as SCI for an NR-V2X service.

When the PSCI for NR-V2X sidelink positioning and the SCI for the NR-V2X service are multiplexed and transmitted in the same slot, the corresponding PSCI may be positioned in front or behind immediately adjacent to the SCI for the NR-V2X service. For example, when the $1^{st}$ stage PSCI and the $1^{st}$ stage SCI are transmitted through the same PSCCH, the $1^{st}$ stage PSCI may be positioned immediately before or after a resource allocated for the $1^{st}$ stage SCI of the corresponding PSCCH.

According to an embodiment, the $1^{st}$ stage PSCI and the $2^{nd}$ stage PSCI may also be transmitted through different channels. For example, the $1^{st}$ stage PSCI may be transmitted using the PSCCH, and the $2^{nd}$ stage PSCI may be transmitted using the PSSCH. In this case, the position of the $2^{nd}$ stage PSCI allocated on the PSSCH may be indicated through the $1^{st}$ stage PSCI.

According to an embodiment, when the $1^{st}$ stage SCI for the NR-V2X service is transmitted through the PSCCH and the $2^{nd}$ stage SCI for the NR-V2X service is transmitted through the PSSCH, the $2^{nd}$ stage PSCI allocated on the PSSCH may be positioned immediately before or after a resource allocated for the $2^{nd}$ stage SCI. In this case, the position of the $2^{nd}$ stage PSCI allocated on the PSSCH may be indicated through the $1^{st}$ stage PSCI.

The information on the positioning operation may be an indicator indicating a positioning type and may be indicated by a UE that requests to perform positioning, i.e., a positioning UE and (or) a neighboring UE that participates in positioning.

For example, the positioning type may broadly include absolute positioning, relative positioning, and absolute positioning with a relative position.

The absolute positioning may include UE-based absolute positioning in which a UE receives positioning related information from a neighboring AN and measures a position of the UE, and AN-based absolute positioning in which an AN receives measurement information required for positioning from a UE and measures a position of the UE when there is a request for positioning from the UE.

The relative positioning may include UE-based relative positioning in which a UE measures a relative position of a neighboring UE or an AN, and AN-based absolute positioning in which the AN measures a relative position of the neighboring UE.

The absolute positioning with a relative position may include UE-based absolute positioning with a relative position in which a UE measures a position thereof using a relative position and an absolute position of a neighboring UE or an AN, and an AN-based absolute positioning with a relative position in which the AN measures the position of a UE using a relative position and an absolute position of the neighboring UE.

Hereinafter, information included in the $1^{st}$ stage PSCI and the $2^{nd}$ stage PSCI for each of the various positioning types will be described.

The $1^{st}$ stage PSCI of the UE-based absolute positioning may include sidelink control information that is commonly used in positioning modes such as broadcast, unicast, and groupcast. For example, the $1^{st}$ stage PSCI of the UE-based absolute positioning may include information on an absolute position of an AN, positioning quality indication (PQI) information on the absolute position of the AN, reservation information of a positioning reference signal (PRS) to be transmitted to a UE by the AN, e.g., a PRS ID or a time at which the PRS is reserved, and information on a positioning mode.

The $2^{nd}$ stage PSCI of the UE-based absolute positioning may include various pieces of control information required for a positioning operation in consideration of the features of the positioning mode indicated through the $1^{st}$ stage PSCI. For example, the $2^{nd}$ stage PSCI for a broadcast mode in the UE-based absolute positioning may include various pieces of control information for a broadcast mode in which positioning is performed using a positioning signal and information that are transmitted from an AN periodically or aperiodically, the $2^{nd}$ stage PSCI for a unicast mode may include various pieces of control information for performing positioning using an absolute position and a relative position of one AN according to a request of a positioning UE, and the $2^{nd}$ stage PSCI for a groupcast mode may include various pieces of control information for performing positioning using an absolute position and a relative position of an AN group according to a request of the positioning UE.

The $1^{st}$ stage PSCI of the AN-based absolute positioning may include sidelink control information that is commonly used in a positioning mode such as broadcast, unicast, or groupcast. For example, the $1^{st}$ stage PSCI of the AN-based absolute positioning may include reservation information of a PRS to be transmitted to an AN by a UE, e.g., a PRS ID for each antenna group or a time at which the PRS is reserved, and information on a positioning mode.

The $2^{nd}$ stage PSCI of the AN-based absolute positioning may include various pieces of control information required for a positioning operation in consideration of the features of a positioning mode indicated through the $1^{st}$ stage PSCI. For example, when a position of an antenna group and a reference point of a UE are different from each other, the $2^{nd}$ stage PSCI of the AN-based absolute positioning may include 1) relative position related information of an antenna group of the reference point of the UE or 2) relative positioning related information of the reference point of the UE of the antenna group. Here, the reference point may indicate a position of the UE and may be the same as a position of one arbitrary antenna group or may indicate a virtual position of the UE.

The $1^{st}$ stage PSCI of the UE-based absolute positioning may include sidelink control information that is commonly used in a positioning mode such as broadcast, unicast, or groupcast. For example, the $1^{st}$ stage PSCI of the UE-based absolute positioning may include reservation information of a PRS to be transmitted to a neighboring UE or an AN by the UE, reservation information of a PRS to be transmitted to the UE by the neighboring UE or the AN, e.g., a PRS ID or a time at which the PRS is to be reserved, and information on a positioning mode.

The $2^{nd}$ stage PSCI of the UE-based absolute positioning may include various pieces of control information required for a positioning operation in consideration of the features of a positioning mode indicated through the $1^{st}$ stage PSCI. For example, when a position of an antenna group and a reference point of a UE are different from each other based on the neighboring UE or the AN, the $2^{nd}$ stage PSCI of the UE-based absolute positioning may include 1) relative position related information of an antenna group of the reference point of the UE or 2) relative position related information of the reference point of the UE based on the antenna group.

The $1^{st}$ stage PSCI of the AN-based relative positioning may include sidelink control information that is commonly used in a positioning mode such as broadcast, unicast, or groupcast. For example, the $1^{st}$ stage PSCI of the AN-based relative positioning may include reservation information of a PRS to be transmitted to the UE by a neighboring UE or an AN, reservation information of a PRS to be transmitted to the neighboring UE or the AN by the UE, e.g., a PRS ID or a time at which the PRS is to be reserved, and information on the positioning mode.

The $2^{nd}$ stage PSCI of the AN-based relative positioning may include various pieces of control information required for a positioning operation in consideration of the features of a positioning mode indicated through the $1^{st}$ stage PSCI. For example, when a position of an antenna group and a reference point of a UE are different from each other based on a positioning UE, the $2^{nd}$ stage PSCI of the AN-based relative positioning may include 1) relative position related information of an antenna group based on a reference point of the UE or 2) relative position related information of the reference point of the UE based on the antenna group. The $2^{nd}$ stage PSCI of the AN-based relative positioning may include relative position related information of the UE measured by the AN.

The $1^{st}$ stage PSCI of the UE-based absolute positioning with a relative position may include sidelink control information that is commonly used in a positioning mode such as broadcast, unicast, or groupcast. For example, the $1^{st}$ stage PSCI of the UE-based absolute positioning with a relative position may include absolute position information of a neighboring UE or an AN, reservation information of a PRS to be transmitted to the UE by the neighboring UE or the AN, reservation information of a PRS to be transmitted to the neighboring UE or the AN by the UE, e.g., a PRS ID or a time at which the PRS is to be reserved, and information on a positioning mode.

The $2^{nd}$ stage PSCI of the UE-based absolute positioning with a relative position may include various pieces of control information required for a positioning operation in consideration of the features of a positioning mode indicated through the $1^{st}$ stage PSCI. For example, when a position of an antenna group and a reference point of a UE are different from each other based on the neighboring UE or the AN, the $2^{nd}$ stage PSCI of the UE-based absolute positioning with a relative position may include 1) relative position related information of an antenna group of the reference point of the UE or 2) relative position related information of the reference point of the UE based on the antenna group.

The $1^{st}$ stage PSCI of the AN-based absolute positioning with a relative position may include sidelink control information that is commonly used in a positioning mode such as broadcast, unicast, or groupcast. For example, the $1^{st}$ stage PSCI of the AN-based absolute positioning with a relative position may include reservation information of a PRS to be transmitted to the UE by the neighboring UE or the AN, reservation information of a PRS to be transmitted to the neighboring UE or the AN by the UE, e.g., a PRS ID or a time at which the PRS is to be reserved, information on a positioning mode, and information on an absolute position of the UE measured by the AN.

The $2^{nd}$ stage PSCI of the AN-based absolute positioning with a relative position may include various pieces of control information required for a positioning operation in consideration of the features of a positioning mode indicated through the $1^{st}$ stage PSCI. For example, when the position of an antenna group and the reference point of the UE are different from each other based on a positioning UE, the $2^{nd}$ stage PSCI of the AN-based absolute positioning with a relative position may include 1) relative position related information of an antenna group based on the reference point of the UE or 2) relative position related information of the reference point of the UE based on the antenna group. The $2^{nd}$ stage PSCI of the AN-based absolute positioning with a relative position may include information on a relative position of the UE measured by the AN.

Hereinafter, an effective 2-stage PSCI operation method for transmitting positioning related signaling in consideration of various positioning slot structures will be described. In the following description, the 2-stage PSCI represents a method of transmitting positioning related PSCI.

FIG. 13 is a diagram for explaining a positioning slot structure-1 according to an embodiment.

Hereinafter, with reference to FIG. 13, the features of the positioning slot structure-1, a type of positioning performed in the positioning slot structure-1, and a 2-stage PSCI operation in the positioning slot structure-1 will be described in detail.

The positioning slot structure-1 of FIG. 13 may be different from an NR-V2X service slot and may represent a PRS slot for dedicatedly performing positioning. In this case, the PRS slot may be generated by emptying or newly inserting an NR-V2X service slot.

The positioning slot structure-1 may broadly include 1) an automatic gain control (AGC) symbol duration for ensuring a time taken to adjust power of an input signal, 2) a PSCCH pool duration for transmitting the $1^{st}$ stage PSCI, 3) a PSSCH pool duration for transmitting the $2^{nd}$ stage PSCI, 4) a transition symbol duration for ensuring a time taken until a request PRS is transmitted through a wide-band after SCI is transmitted through a narrow-band subchannel, 5) a PRS pool duration for transmitting a PRS, and 6) a guard symbol duration for ensuring a time taken to receive a next slot after the PRS is transmitted. Here, the PSCCH pool may include one or more subchannels, and the PRS pool duration may be used to transmit a PRS for various purposes according to a positioning type or a positioning mode. For example, when a positioning UE performs relative positioning with a neighboring UE, a request PRS transmitted to the neighboring UE from the positioning UE and a neighboring UE transmitted to the positioning UE from the neighboring UE may be transmitted in a PRS pool.

A type of positioning performed in the positioning slot structure-1 may include UE-based absolute positioning, AN-based absolute positioning, UE-based relative positioning, AN-based relative positioning, UE-based absolute positioning with a relative position, and AN-based absolute positioning with a relative position.

In the 2-stage PSCI operation method for transmitting PSCI in the positioning slot structure-1, the $1^{st}$ stage PSCI and the $2^{nd}$ stage PSCI may be transmitted in the same slot, and whether the $2^{nd}$ stage PSCI is present and is transmitted may be indicated through the $1^{st}$ stage PSCI.

In the positioning slot structure-1, the $1^{st}$ stage PSCI may be transmitted through a PSCCH of a PRS slot, and the $2^{nd}$ stage PSCI may be transmitted through a PSSCH of a PRS slot.

Figure 14:
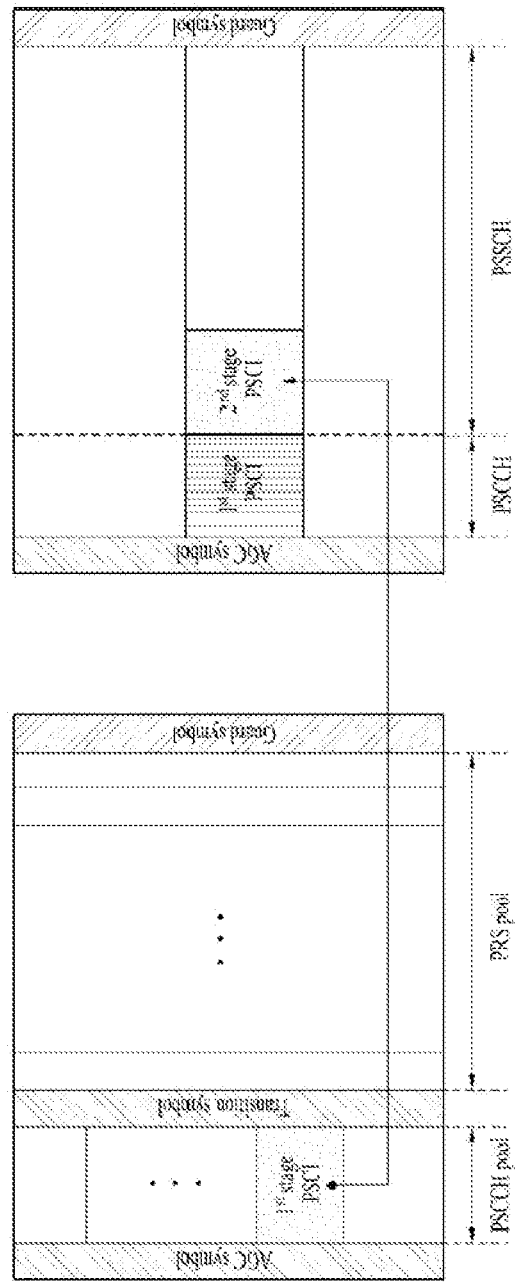
FIG. 14 is a diagram for explaining a positioning slot structure-2 according to an embodiment.

FIG. 14 is a diagram for explaining a positioning slot structure-2 according to an embodiment.

Hereinafter, with reference to FIG. 14, the features of the positioning slot structure-2, a type of positioning performed in the positioning slot structure-2, and a 2-stage PSCI operation in the positioning slot structure-2 will be described in detail.

The positioning slot structure-2 may represent a positioning structure using a PRS slot and an NR-V2X service slot. Compared with the positioning slot structure-1, the $2^{nd}$ stage PSCI may be transmitted through an NR-V2X service slot in the positioning slot structure-2.

A type of positioning performed in the positioning slot structure-2 may include UE-based absolute positioning, AN-based absolute positioning, UE-based relative positioning, AN-based relative positioning, UE-based absolute positioning with a relative position, and AN-based absolute positioning with a relative position.

In the 2-stage PSCI operation method for transmitting PSCI in the positioning slot structure-2, the $1^{st}$ stage PSCI and the $2^{nd}$ stage PSCI may be transmitted in different slots, and whether the $2^{nd}$ stage PSCI is present and is transmitted may be indicated through the $1^{st}$ stage PSCI.

In the positioning slot structure-2, the $1^{st}$ stage PSCI may be transmitted through a PSCCH of a PRS slot, and the $2^{nd}$ stage PSCI may be transmitted through a PSSCH of an NR-V2X service slot.

Figure 15:
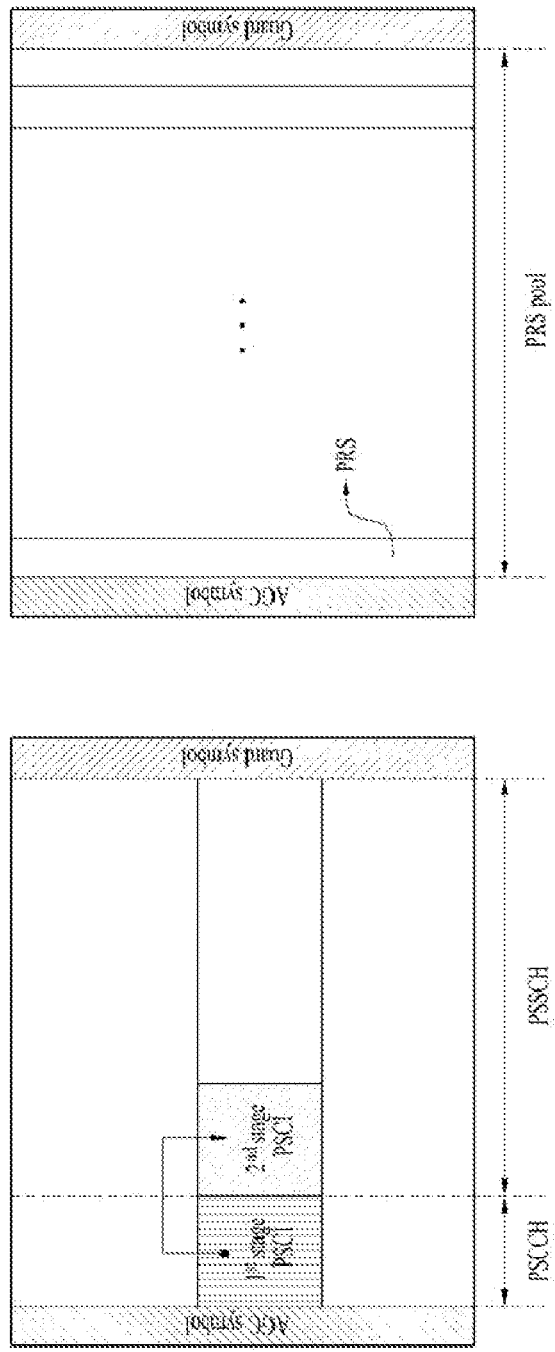
FIG. 15 is a diagram for explaining a positioning slot structure-3 according to an embodiment.

FIG. 15 is a diagram for explaining a positioning slot structure-3 according to an embodiment.

Hereinafter, with reference to FIG. 15, the features of the positioning slot structure-3, a type of positioning performed in the positioning slot structure-3, and a 2-stage PSCI operation method in the positioning slot structure-3 will be described in detail.

The positioning slot structure-3 may represent a positioning structure using a PRS slot and an NR-V2X service slot similarly to the positioning slot structure-2. In contrast, in the positioning slot structure-3, PSCI may be transmitted through an NR-V2X service slot, and PSCI may not be transmitted in a PRS slot but only a PRS may be transmitted in the PRS slot.

A type of positioning performed in the positioning slot structure-3 may include UE-based absolute positioning, AN-based absolute positioning, UE-based relative positioning, AN-based relative positioning, UE-based absolute positioning with a relative position, and AN-based absolute positioning with a relative position.

In the 2-stage PSCI operation method for transmitting PSCI in the positioning slot structure-3, the $1^{st}$ stage PSCI and the $2^{nd}$ stage PSCI may be transmitted in the same slot, and whether the $2^{nd}$ stage PSCI is present and is transmitted may be indicated through the $1^{st}$ stage PSCI.

In the positioning slot structure-3, the $1^{st}$ stage PSCI may be transmitted through a PSCCH of an NR-V2X slot, and the $2^{nd}$ stage PSCI may be transmitted through a PSSCH of an NR-V2X service slot.

Figure 16:
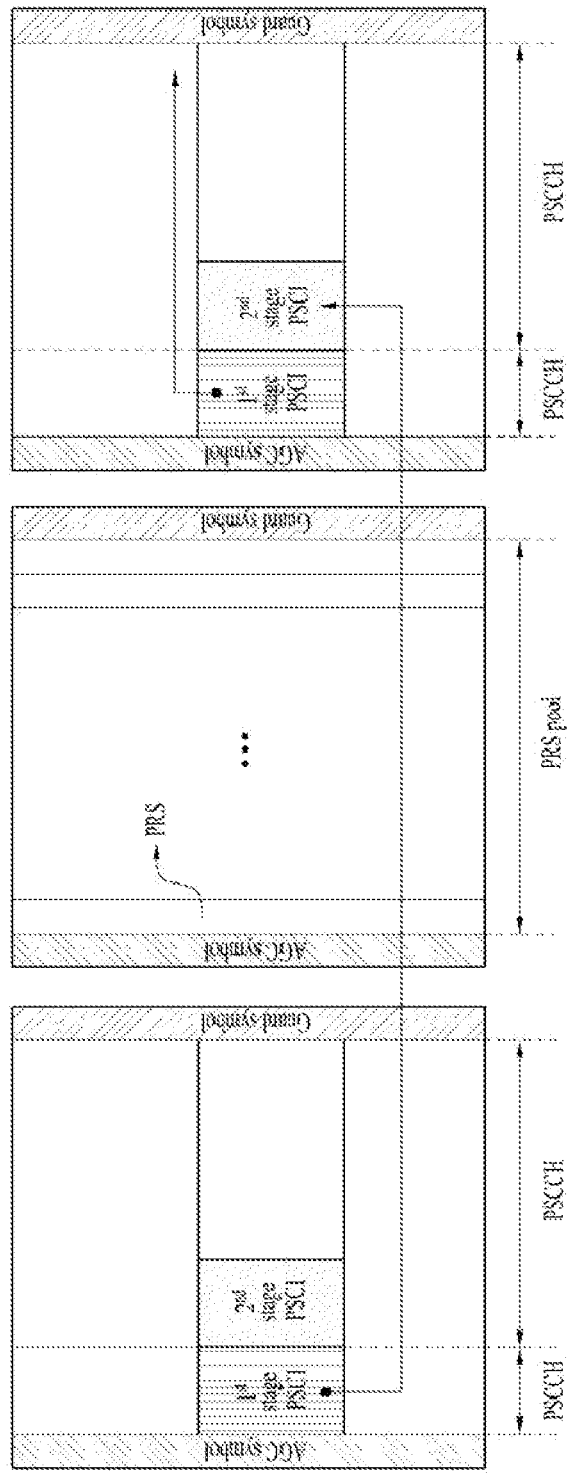
FIG. 16 is a diagram for explaining a positioning slot structure-4 according to an embodiment.

FIG. 16 is a diagram for explaining a positioning slot structure-4 according to an embodiment.

Hereinafter, with reference to FIG. 16, the features of the positioning slot structure-4, a type of positioning performed in the positioning slot structure-4, and a 2-stage PSCI operation method in the positioning slot structure-4 will be described in detail.

The positioning slot structure-4 may represent a positioning structure using a PRS slot and an NR-V2X service slot similarly to the positioning slot structure-3. In contrast, in the positioning slot structure-4, the $1^{st}$ stage PSCI and the $2^{nd}$ stage PSCI may be transmitted through different NR-V2X service slots.

A type of positioning performed in the positioning slot structure-4 may include UE-based absolute positioning, AN-based absolute positioning, UE-based relative positioning, AN-based relative positioning, UE-based absolute positioning with a relative position, and AN-based absolute positioning with a relative position.

In the 2-stage PSCI operation method for transmitting PSCI in the positioning slot structure-4, the $1^{st}$ stage PSCI and the $2^{nd}$ stage PSCI may be transmitted in different slots, and whether the $2^{nd}$ stage PSCI is present and is transmitted may be indicated through the $1^{st}$ stage PSCI.

In the positioning slot structure-4, the $1^{st}$ stage PSCI may be transmitted through a PSCCH of an NR-V2X slot, and the $2^{nd}$ stage PSCI may be transmitted through a PSSCH of an NR-V2X service slot after a PRS slot.

Figure 17:
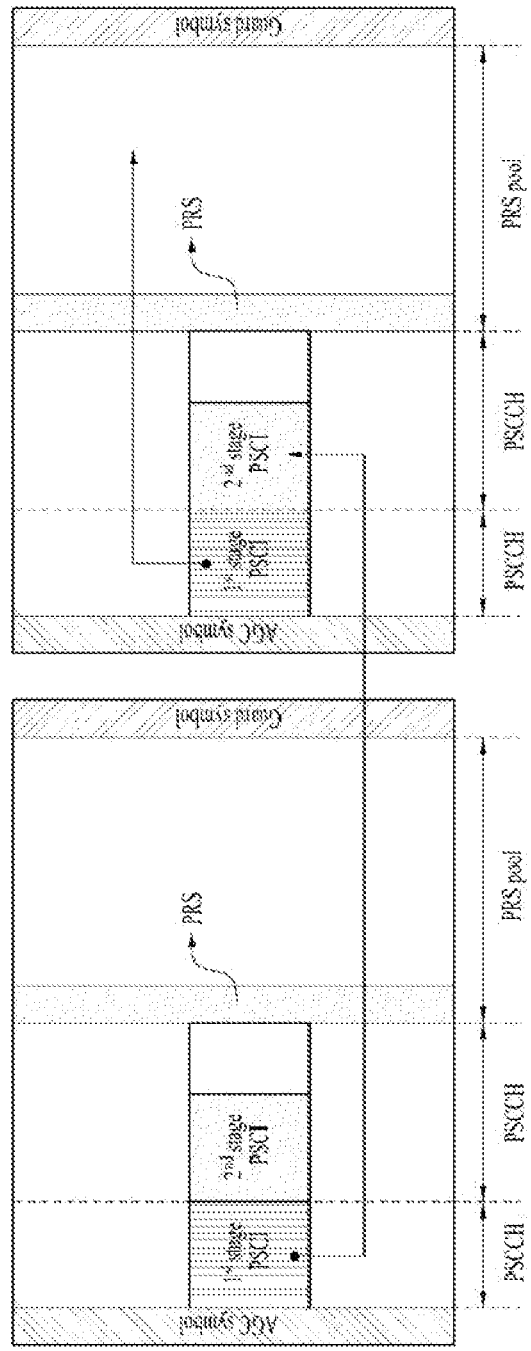
FIG. 17 is a diagram for explaining a positioning slot structure-5 according to an embodiment.

FIG. 17 is a diagram for explaining a positioning slot structure-5 according to an embodiment.

Hereinafter, with reference to FIG. 17, the features of the positioning slot structure-5, a type of positioning performed in the positioning slot structure-5, and a 2-stage PSCI operation method in the positioning slot structure-5 will be described in detail.

The positioning slot structure-5 shows a structure in which PSCI and a PRS are transmitted in an NR-V2X service slot. In this case, the PRS may be transmitted through a PRS pool corresponding to a physical sidelink feedback channel (PSFCH).

A type of positioning performed in the positioning slot structure-5 may include UE-based absolute positioning, AN-based absolute positioning, UE-based relative positioning, AN-based relative positioning, UE-based absolute positioning with a relative position, and AN-based absolute positioning with a relative position.

In the 2-stage PSCI operation method for transmitting PSCI in the positioning slot structure-5, the $1^{st}$ stage PSCI and the $2^{nd}$ stage PSCI may be transmitted in different slots, and whether the $2^{nd}$ stage PSCI is present and is transmitted may be indicated through the $1^{st}$ stage PSCI.

In the positioning slot structure-5, the $1^{st}$ stage PSCI may be transmitted through a PSCCH of an NR-V2X slot, and the $2^{nd}$ stage PSCI may be transmitted through a PSSCH of an NR-V2X service slot after the $1^{st}$ stage PSCI is transmitted.

As described above, the methods of transmitting control information for sidelink positioning according to the present disclosure may provide a 2-stage PSCI operation method for effectively providing sidelink positioning related SCI, i.e., PSCI in an NR-V2X positioning system. In particular, the 2-stage PSCI operation method according to embodiments may advantageously provide flexibility, efficiency and optimization in allocation of a PSCI resource in consideration of the features of positioning for each positioning mode by defining required PSCI in consideration of various factors that affects positioning, such as a positioning type, a structure of a positioning slot, and arrangement of antenna groups and mapping and transmitting the $1^{st}$ stage PSCI and the $2^{nd}$ stage PSCI to the PSCCH and the PSSCH in a PRS slot and (or) an NR-V2X service slot in various forms.

Figure 18:
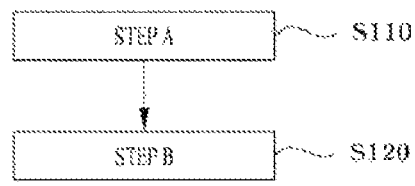
FIG. 18 is a diagram for explaining a sidelink positioning procedure according to an embodiment.

FIG. 18 is a diagram for explaining a sidelink positioning procedure according to an embodiment.

Referring to FIG. 18, in STEP A S110, a UE may receive the $1^{st}$ stage PSCI and the $2^{nd}$ stage PSCI through the positioning slot structures 1 to 5 shown in FIGS. 13 to 17 above.

In STEP B S120, the UE may perform positioning based on the received $1^{st}$ stage PSCI and $2^{nd}$ stage PSCI.

Figure 19:
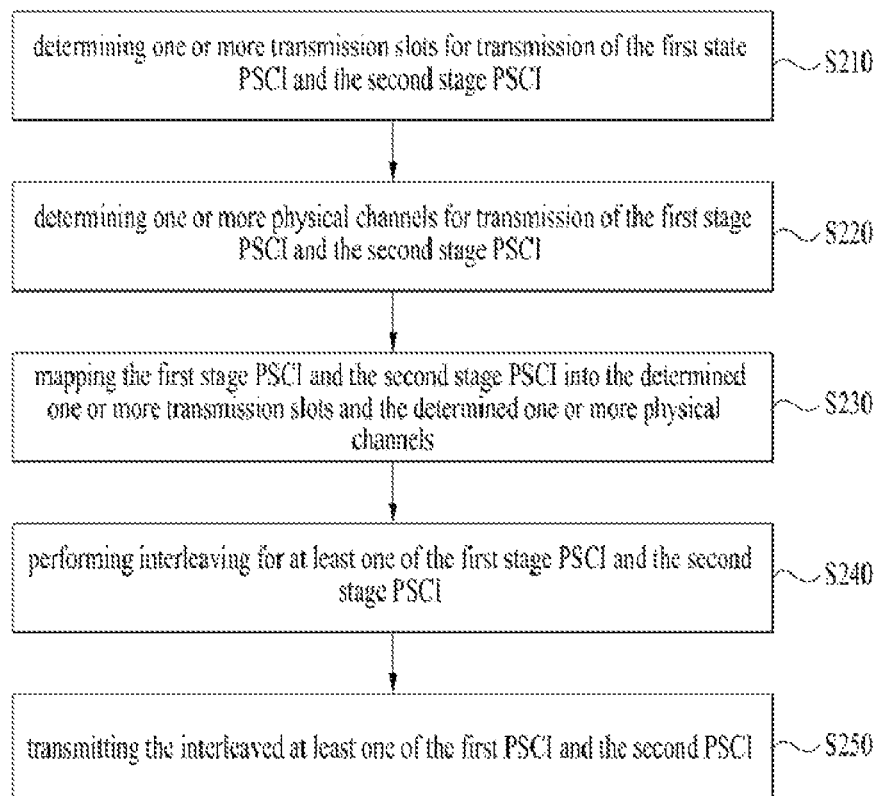
FIG. 19 is a flowchart for explaining a control information transmission method for sidelink positioning according to an embodiment.

FIG. 19 is a flowchart for explaining a control information transmission method for sidelink positioning according to an embodiment.

Referring to FIG. 19, a UE may determine at least one transmission slot for transmission of the $1^{st}$ stage PSCI and the $2^{nd}$ stage PSCI (S210). Here, the transmission slot may include an NR-V2X service slot and a PRS slot.

The UE may determine at least one physical channel for transmission of the $1^{st}$ stage PSCI and the $2^{nd}$ stage PSCI (S220). Here, the physical channel may include a PSCCH, a PSSCH, an ePSCCH, and an ePSSCH.

The UE may map the $1^{st}$ stage PSCI and the $2^{nd}$ stage PSCI to the at least one determined transmission slot and at least one physical channel (S230). In this case, the position of the 2nd stage PSCI mapped to the transmission slot and the physical channel may be indicated by the $1^{st}$ stage PSCI.

The UE may perform interleaving on at least one of the $1^{st}$ stage PSCI or the $2^{nd}$ stage PSCI (S240).

The UE may transmit the at least one interleaved $1^{st}$ stage PSCI and $2^{nd}$ stage PSCI (S250). In this case, the $1^{st}$ stage PSCI and the $2^{nd}$ stage PSCI may be multiplexed and transmitted with SCI for an NR-V2X service.

In this case, multiplexing may be performed using at least one of a TDM method and an FDM method.

According to an embodiment, the $1^{st}$ stage PSCI and the $2^{nd}$ stage PSCI may be mapped to different physical channels in one transmission slot.

According to another embodiment, the $1^{st}$ stage PSCI and the $2^{nd}$ stage PSCI may be mapped to different physical channels of different types of transmission slots.

According to another embodiment, the $1^{st}$ stage PSCI and the $2^{nd}$ stage PSCI may be mapped to the same physical channel of different types of transmission slots.

According to another embodiment, the $1^{st}$ stage PSCI and the $2^{nd}$ stage PSCI may be mapped to different physical channels of the same type of consecutive transmission slots.

According to another embodiment, the $1^{st}$ stage PSCI and the $2^{nd}$ stage PSCI may be mapped to different physical channels of different types of consecutive transmission slots.

According to another embodiment, the $1^{st}$ stage PSCI and the $2^{nd}$ stage PSCI may be mapped to different physical channels of different types of inconsecutive transmission slots.

According to another embodiment, the $1^{st}$ stage PSCI and the $2^{nd}$ stage PSCI may be mapped to the same physical channel of different types of inconsecutive transmission slots.

FIGS. 18 and 19 are flowcharts showing an operation of an apparatus related to the aforementioned embodiments. However, the above flowchart may not necessarily mean that all of the above steps are performed or that only the above steps are performed, and necessary steps may be performed or predetermined steps may be omitted according to contents described in the aforementioned embodiment. Operations of the flowchart may constitute one of the aforementioned proposals.

Embodiment 2

The following embodiment(s) proposes various resource allocation methods for transmitting positioning related PSCI through a PSCCH and a PSSCH in a sidelink NR-V2X positioning system. Hereinafter, four different types of proposed resource allocation methods will be summarized.

1) Resource allocation method for transmission of $1^{st}$-stage PSCI on PSCCH
2) Resource allocation method for transmission of $2^{nd}$-stage PSCI on PSSCH
3) Resource allocation method for transmission of $1^{st}$-stage PSCI on PSCCH and extended PSCCH (ePSCCH)
4) Resource allocation method for transmission of $2^{nd}$-stage PSCI on PSSCH and extended PSSCH (ePSSCH)

The following embodiment(s) may propose various resource allocation methods based on 2-stage PSCI for effectively transmitting PSCI including positioning related control information or signaling in a sidelink NR-V2X positioning system. In particular, embodiment(s) may propose various $1^{st}$-stage PSCI and $2^{nd}$-stage PSCI resource allocation methods based on a resource allocation structure and method of the $1^{st}$-stage SCI and the $2^{nd}$-stage SCI that are considered for transmission of NR-V2X service related control information on a PSCCH and a PSSCH as a resource allocation method for effective transmission of the 2-stage PSCI with sidelink NR-V2X service related 2-stage SCI. In this case, SCI transmitted through the PSCCH and SCI transmitted through the PSSCH may be defined as $1^{st}$-stage SCI and $2^{nd}$-stage SCI, respectively [3GPP TSG RAN WG1 Meeting #98, Chairman's Notes]. Hereinafter, SCI may mean service related control information and PSCI may mean positioning related control information.

Hereinafter, the proposed 1) resource allocation method for transmission of the $1^{st}$-stage PSCI on the PSCCH, 2) resource allocation method for transmission of the $2^{nd}$-stage PSCI on the PSSCH, 3) resource allocation method for transmission of the $1^{st}$-stage PSCI on the ePSCCH, and 4) resource allocation method for transmission of the $2^{nd}$-stage PSCI on the ePSSCH will be described.

Figure 20:
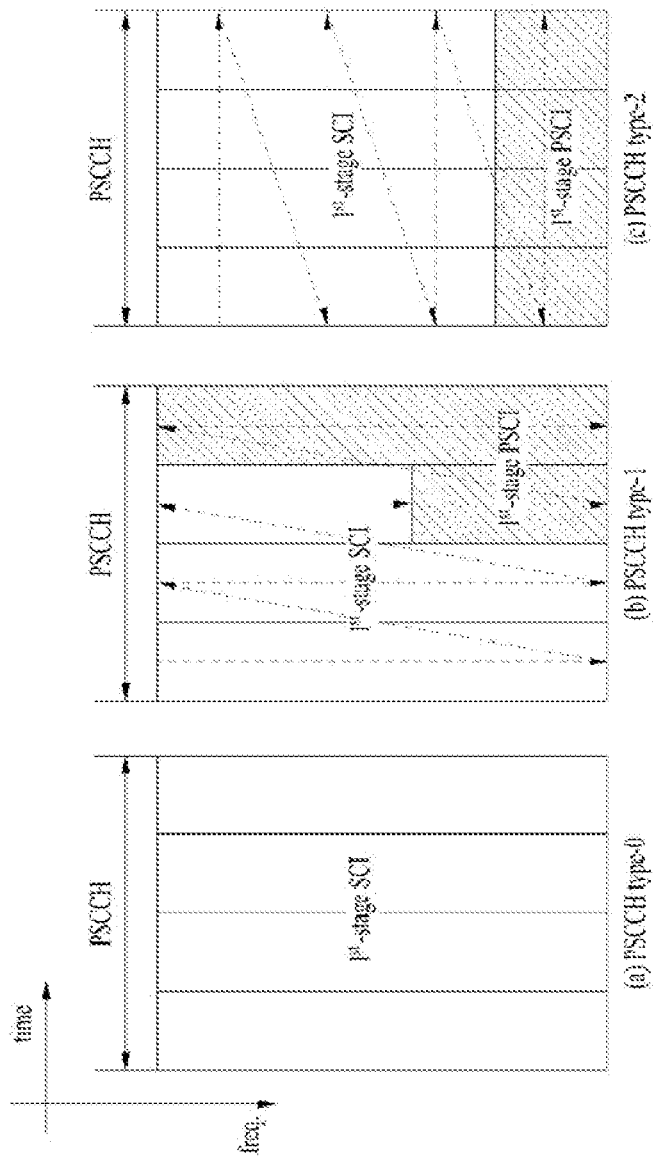
FIG. 20 is a diagram for explaining a resource allocation method for transmission of $1^{st}$-stage PSCI on a PSCCH according to an embodiment.

FIG. 20 is a diagram for explaining a resource allocation method for transmission of $1^{st}$-stage PSCI on a PSCCH according to an embodiment.

Referring to FIG. 20, the resource allocation method for transmission of the $1^{st}$-stage PSCI on the PSCCH may be broadly divided into a PSCCH type-0, a PSCCH type-1, and a PSCCH type-2.

PSCCH type-0: As shown in FIG. 20(a), the PSCCH type-0 may be a resource allocation method without $1^{st}$-stage PSCI or without distinguishing between $1^{st}$-stage SCI and $1^{st}$-stage PSCI. In this case, SCI may include control information of an NR-V2X service and positioning and may or may not be interleaved according to a channel fading status, V2X service demand latency, V2X service quality, or the like. Content related to interleaving will become clearer through a description of the drawings to be described later.

In the PSCCH type-0, the PSCCH may include one or more RBs and one or more symbols, and in this case, the number of RBs and the number of symbols may be predefined or may be determined by a location server/LMF and/or a BS.

PSCCH type-1: The PSCCH type-1 of FIG. 20(b) may be a method of allocating a resource by consecutively arranging $1^{st}$-stage SCI and $1^{st}$-stage PSCI without interleaving SCI and PSCI.

FIG. 20(b) shows an embodiment in which resource allocation of $1^{st}$-stage PSCI is performed after resource allocation of $1^{st}$-stage SCI is performed. In this case, resource allocation may be performed in units of symbols. That is, when resource allocation on one symbol on a PSCCH is completed, resource allocation may be performed in a next consecutive symbol. In FIG. 20(b), a shaded area indicates a transmission resource for the $1^{st}$-stage PSCI on the PSCCH.

Hereinafter, the features of a receiving UE related to the PSCCH type-1 will be described.

When total size information of the PSCCH and size information of the $1^{st}$-stage SCI on the PSCCH are given, the receiving UE related to the PSCCH type-1 may recognize the position of a resource of the PSCCH, in which the $1^{st}$-stage PSCI is transmitted, and as a result, only the $1^{st}$-stage PSCI may be received without receiving the $1^{st}$-stage SCI. In addition, the receiving UE related to the PSCCH type-1 may receive the $1^{st}$-stage PSCI and may simultaneously perform a decoding process.

PSCCH type-2: The PSCCH type-2 of FIG. 20(c) may be a method of allocating a resource by interleaving SCI and PSCI and consecutively arranging $1^{st}$-stage SCI and $1^{st}$-stage PSCI. FIG. 20(c) shows an embodiment in which resource allocation of $1^{st}$-stage PSCI is performed after resource allocation of $1^{st}$-stage SCI is performed. In this case, resource allocation may be performed in units of RBs (or in a row direction on the PSCCH). That is, when resource allocation is completely performed on the same RB over a plurality of symbols on the PSCCH, the same resource may be allocated on a next consecutive RB. In FIG. 20(c), a shaded area indicates a transmission resource for the $1^{st}$-stage PSCI on the PSCCH (or the result of mapping the $1^{st}$-stage PSCI to the PSCCH before interleaving).

Hereinafter, interleaving applicable to SCI and PSCI will be described.

Figure 21:
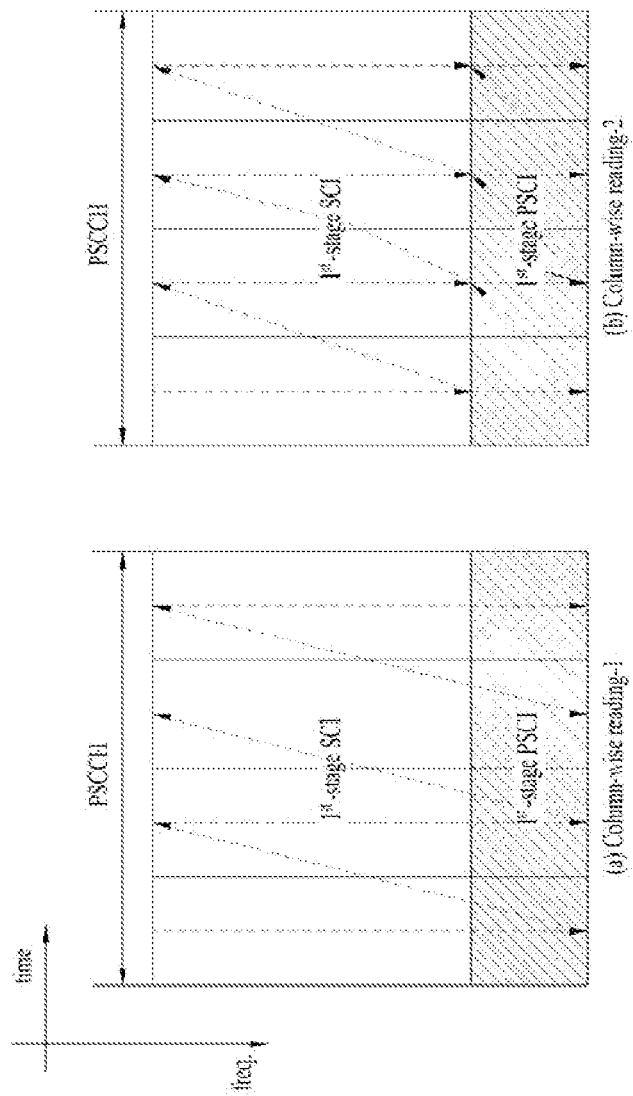
FIG. 21 shows a block interleaving method for transmission of $1^{st}$-stage SCI according to an embodiment.

FIG. 21 shows a block interleaving method for transmission of $1^{st}$-stage SCI according to an embodiment.

In detail, FIG. 21 shows an embodiment of two types of column-wise reading operations after row-wise writing shown in FIG. 20(c). Hereinafter, the main features of operations of column-wise reading-1 and column-wise reading-2 will be described.

Column-wise reading-1: The $1^{st}$-stage SCI and the $1^{st}$-stage PSCI may be considered as one piece of SCI and one column-wise reading operation may be performed. While this interleaving method provides an advantage of maximizing an interleaving gain, the receiving UE receives and stores both the $1^{st}$-stage SCI and the $1^{st}$-stage PSCI and then performs a decoding operation, and thus the interleaving method may provide a disadvantage in that an additional buffer memory is required and a deinterleaving time is long.

Column-wise reading-2: A column-wise reading operation may be performed on each of the $1^{st}$-stage SCI and the $1^{st}$-stage PSCI. While this interleaving method has a reduced interleaving gain compared with the column-wise reading-1 method, the receiving UE receives and stores only the $1^{st}$-stage PSCI and then performs a decoding operation, and thus the interleaving method may provide an advantage in that the size of a buffer memory is small and a deinterleaving processing time is short.

Hereinafter, a resource allocation method for transmission of $2^{nd}$-stage PSCI on a PSSCH will be described in detail.

Figure 22:
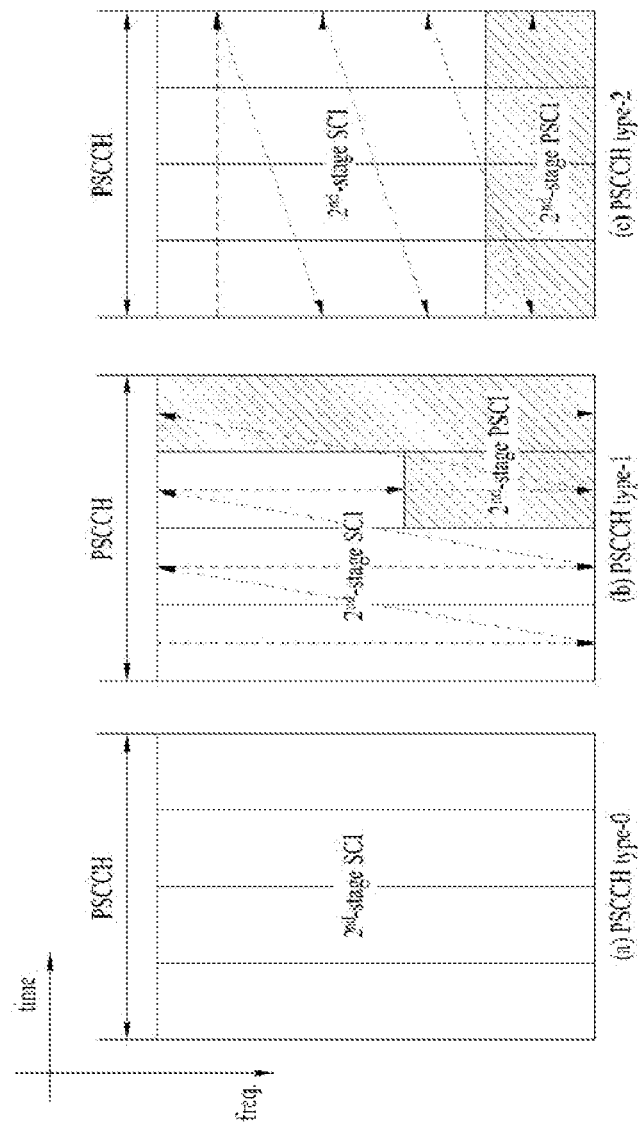
FIG. 22 is a diagram for explaining a resource allocation method for transmission of $2^{nd}$-stage PSCI on a PSSCH according to an embodiment.

FIG. 22 is a diagram for explaining a resource allocation method for transmission of $2^{nd}$-stage PSCI on a PSSCH according to an embodiment.

In detail, FIG. 22 is a diagram for explaining a resource allocation method for transmission of $2^{nd}$-stage SCI and $2^{nd}$-stage PSCI on a PSSCH.

In the resource allocation method of FIG. 22, three types of a PSCCH type-0, a PSCCH type-1, and a PSCCH type-2 are considered similarly to the resource allocation method for transmission of the $1^{st}$-stage PSCI on the PSCCH of FIG. 20. In this case, the $2^{nd}$-stage PSCI may include PSCI that is not transmitted due to lack of resources on the PSCCH.

PSSCH type-0: The PSSCH type-0 of FIG. 22(a) may be a resource allocation method without $2^{nd}$-stage PSCI or without distinguishing between $2^{nd}$-stage SCI and $2^{nd}$-stage PSCI.

PSSCH type-1: The PSSCH type-1 of FIG. 22(b) may be a method of allocating a resource by consecutively arranging $2^{nd}$-stage SCI and $2^{nd}$-stage PSCI without interleaving SCI and PSCI and may be the same or similar to the operation and feature of the PSCCH type-1 of FIG. 20(b).

PSSCH type-2: The PSSCH type-2 of FIG. 22(c) may be a method of allocating a resource by interleaving SCI and PSCI and consecutively arranging $2^{nd}$-stage SCI and $2^{nd}$-stage PSCI and may be the same or similar to the operation and feature of the PSCCH type-2 of FIG. 20(c).

Hereinafter, a resource allocation method for transmission of $1^{st}$-stage PSCI on a PPSCCH and an ePSCCH will be described in detail.

Figure 23:
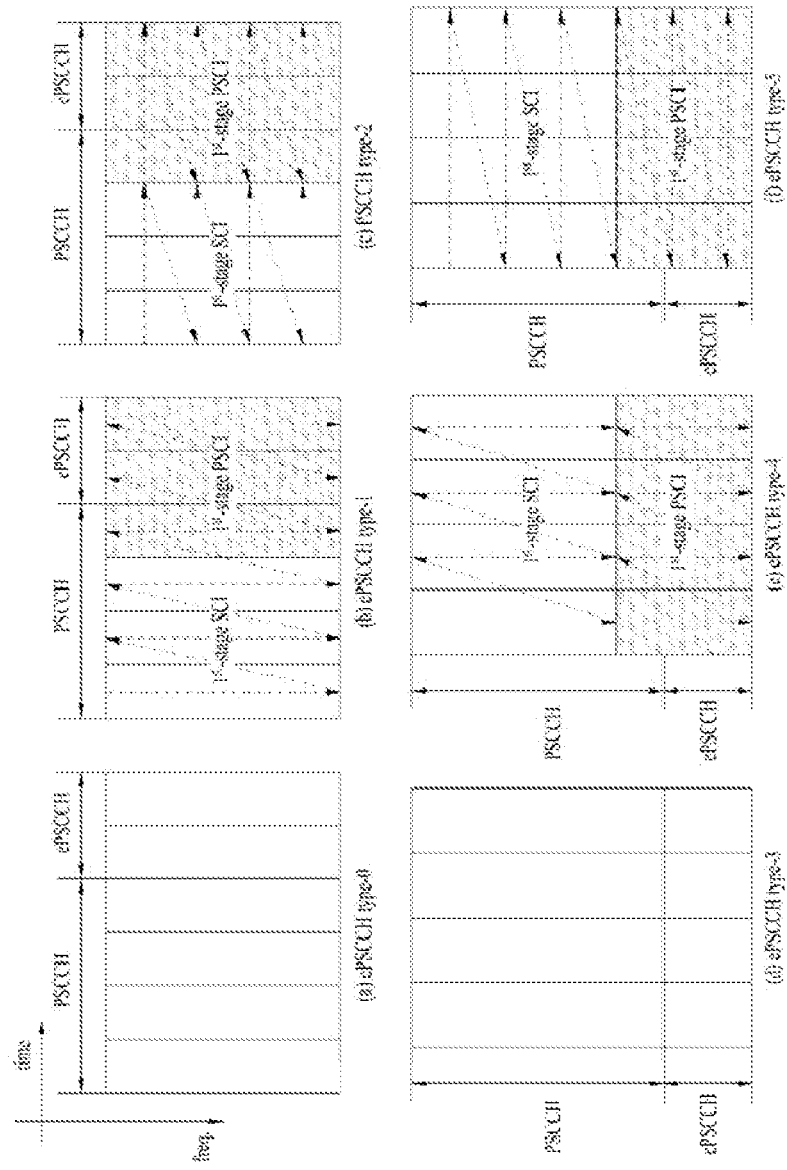
FIG. 23 is a diagram for explaining a resource allocation method for transmission of 1st-stage PSCI on a PSCCH and an ePSCCH according to an embodiment.

FIG. 23 is a diagram for explaining a resource allocation method for transmission of 1st-stage PSCI on a PSCCH and an ePSCCH according to an embodiment.

The ePSCCH may be a control information transmission channel that is newly extended to additionally ensure a resource when the remaining resources are not sufficient to transmit the $1^{st}$-stage PSCI after a resource for transmission of the $1^{st}$-stage SCI on the PSCCH is allocated, and in this case, an additional control channel may be extendable by increasing the number of symbols or increasing the number of RBs. Here, the position and the size of the ePSCCH may be predefined or may be determined by a location server/LMF and/or a BS.

As shown in FIG. 23, the ePSCCH may include an ePSCCH type-0, an ePSCCH type-1, an ePSCCH type-2, an ePSCCH type-3, an ePSCCH type-4, and an ePSCCH type-5.

ePSCCH type-0: The ePSCCH type-0 of FIG. 23(a) may be a resource allocation method without distinguishing between $1^{st}$-stage SCI and $1^{st}$-stage PSCI on a PSCCH and an ePSCCH. In this case, the ePSCCH may have the same RB size as the PSCCH and may have the same number or different numbers of symbols. In the ePSCCH type-0, SCI and PSCI may or may not be interleaved. Content related to interleaving may be replaced with the description of FIGS. 20 and 21.

ePSCCH type-1: The ePSCCH type-1 of FIG. 23(b) may be a method of allocating a resource for transmission of $1^{st}$-stage SCI through a PSCCH without interleaving SCI and PSCI and allocating a resource for transmission of $1^{st}$-stage PSCI using a resource allocated to an ePSCCH and the remaining resource of the PSCCH. In this case, the ePSCCH may have the same RB size as the PSCCH and may have the same number or different numbers of symbols. In FIG. 23(b), a shaded area indicates a transmission resource for the $1^{st}$-stage PSCI on the PSCCH and the ePSCCH. According to the main features of the ePSCCH type-1, the PSCCH and the ePSCCH may be consecutively arranged in the time axis or may be inconsecutively arranged, and resource allocation on the PSCCH and the ePSCCH may be performed in units of symbols similarly to FIG. 20(b).

ePSCCH type-2: The ePSCCH type-2 of FIG. 23(c) may be a method of interleaving SCI and PSCI, allocating a resource for transmission of $1^{st}$-stage SCI through a PSCCH, and allocating a resource for transmission of $1^{st}$-stage PSCI using a resource allocated to an ePSCCH and the remaining resource of a PSCCH, similarly to FIG. 20(c). In this case, the ePSCCH may have the same RB size as the PSCCH and may have the same number or different numbers of symbols. In FIG. 23(c), a shaded area indicates a transmission resource for the $1^{st}$-stage PSCI on the PSCCH and the ePSCCH. According to the main feature of the ePSCCH type-2, block interleaving may be independently performed on the SCI and the PSCI and resource allocation on the PSCCH and the ePSCCH may be performed in units of RBs similarly to FIG. 20(c).

ePSCCH type-3: The ePSCCH type-3 of FIG. 23(d) may be a resource allocation method without distinguishing between $1^{st}$-stage SCI and $1^{st}$-stage PSCI on a PSCCH and an ePSCCH. In this case, the ePSCCH may have the same number of symbols as the PSSCH and may have the same RB size or different RB sizes. In the ePSCCH type-3, SCI and PSCI may or may not be interleaved. Content related to interleaving may be replaced with the description of FIGS. 20 and 21.

ePSCCH type-4: The ePSCCH type-4 of FIG. 23(e) may be a method of allocating a resource for transmission of $1^{st}$-stage SCI through a PSCCH without interleaving SCI and PSCI and allocating a resource for transmission of $1^{st}$-stage PSCI using a resource allocated to an ePSCCH and the remaining resource of the PSCCH. In this case, the ePSCCH may have the same number of symbols as the PSSCH and may have the same RB size or different RB sizes. In FIG. 23(e), a shaded area indicates a transmission resource for the $1^{st}$-stage PSCI on the PSCCH and the ePSCCH. According to the main features of the ePSCCH type-4, the PSCCH and the ePSCCH may be consecutively arranged in the frequency axis or may be inconsecutively arranged, and resource allocation on the PSCCH and the ePSCCH may be performed in units of symbols similarly to FIG. 20(b).

ePSCCH type-5: The ePSCCH type-5 of FIG. 23(f) may be a method of interleaving SCI, allocating a resource for transmission of $1^{st}$-stage SCI through a PSCCH, and allocating a resource for transmission of $1^{st}$-stage PSCI using a resource acquired through an ePSCCH and the remaining resource of a PSCCH, similarly to FIG. 20(c). In this case, the ePSCCH may have the same number of symbols as the PSSCH and may have the same RB size or different RB sizes. In FIG. 23(f), a shaded area indicates a transmission resource for the $1^{st}$-stage PSCI on the PSCCH and the ePSCCH. According to the main feature of the ePSCCH type-5, block interleaving may be independently performed on the SCI and the PSCI and resource allocation on the PSCCH and the ePSCCH may be performed in units of RBs similarly to FIG. 20(c).

ePSCCH type-x: Differently from the aforementioned ePSCCH type-0 to ePSCCH type-5, the ePSCCH type-x may have the same RB size or different RB sizes from the PSCCH or may have the same number or different numbers of symbols. The PSCCH and the ePSCCH may be consecutively arranged in the time axis or the frequency axis or may be inconsecutively arranged. In addition, the SCI and the PSCI may or may not be interleaved.

Hereinafter, a resource allocation method for transmission of $2^{nd}$-stage PSCI on a PSSCH and an ePSSCH will be described in more detail.

FIG. 24 is a diagram for explaining a resource allocation method for transmission of $2^{nd}$-stage PSCI on a PSSCH and an ePSSCH according to an embodiment.

The resource allocation method of FIG. 24 may consider six types of an ePSSCH type-0, an ePSSCH type-1, an ePSSCH type-2, an ePSSCH type-3, an ePSSCH type-4, and an ePSSCH type-5 similarly to the resource allocation method for transmission of the $1^{st}$-stage PSCI on the PSCCH and the ePSCCH of FIG. 23, and in this case, the $2^{nd}$-stage PSCI may include PSCI that is not transmitted due to lack of resources on the PSSCH.

ePSSCH type-0: The ePSSCH type-0 of FIG. 24(a) may be a resource allocation method without distinguishing between $2^{nd}$-stage SCI and $2^{nd}$-stage PSCI on a PSSCH and an ePSSCH. In this case, the ePSSCH may have the same RB size as the PSSCH and may have the same number or different numbers of symbols.

ePSSCH type-1: The ePSSCH type-1 of FIG. 24(b) may be a method of allocating a resource for transmission of $2^{nd}$-stage SCI through a PSSCH without interleaving SCI and PSCI and allocating a resource for transmission of $2^{nd}$-stage PSCI using a resource allocated to an ePSCCH and the remaining resource of a PSCCH similarly to FIG. 23(b). In this case, the ePSCCH may have the same RB size as the PSCCH and may have the same number or different numbers of symbols.

ePSSCH type-2: The ePSSCH type-2 of FIG. 24(c) may be a method of allocating a resource by interleaving SCI and PSCI, allocating a resource for transmission of $2^{nd}$-stage SCI through a PSSCH, and allocating a resource for transmission of $2^{nd}$-stage PSCI using a resource allocated to an ePSSCH and the remaining resource of a PSSCH similarly to FIG. 23 (c). In this case, the ePSSCH may have the same RB size as the PSSCH and may have the same number or different numbers of symbols.

ePSSCH type-3: The ePSSCH type-3 of FIG. 24(d) may be a resource allocation method without distinguishing between $2^{nd}$-stage SCI and $2^{nd}$-stage PSCI on a PSSCH and an ePSSCH similarly to FIG. 23(d). In this case, the ePSSCH may have the same number of symbols as the PSSCH and may have the same RB size or different RB sizes.

ePSSCH type-4: The ePSSCH type-4 of FIG. 24(e) may be a method of allocating a resource for transmission of $2^{nd}$-stage SCI through a PSSCH without interleaving SCI and PSCI and allocating a resource for transmission of $2^{nd}$-stage PSCI using a resource allocated to an ePSSCH and the remaining resource of the PSSCH similarly to FIG. 23(e). In this case, a resource for the ePSCCH may be acquired by increasing the number of RBs based on the PSSCH.

ePSSCH type-5: The ePSSCH type-5 of FIG. 24(f) may be a method of allocating a resource by interleaving SCI and PSCI, allocating a resource for transmission of $2^{nd}$-stage SCI through a PSSCH, and allocating a resource for transmission of $2^{nd}$-stage PSCI using a resource acquired through an ePSSCH and the remaining resource of a PSSCH similarly to FIG. 23(f). In this case, the ePSSCH may have the same number of symbols as the PSSCH or may have the same RB size or different RB sizes.

ePSSCH type-x: Differently from the aforementioned ePSSCH type-0 to ePSSCH type-5, the ePSSCH type-x may have the same RB size or different RB sizes from the PSCCH or may have the same number or different numbers of symbols. The PSCCH and the ePSSCH may be consecutively arranged in the time axis or the frequency axis or may be inconsecutively arranged. In addition, the SCI and the PSCI may or may not be interleaved.

Conventionally, there is a problem in that 2-stage SCI is applied only to SCI transmission related to an NR-V2X service and that PSCI related to performing of sidelink positioning is not considered at all.

Accordingly, the proposed resource allocation methods for transmission of PSCI as positioning related control information in a sidelink NR-V2X positioning system may have an advantage of improving transmission efficiency of PSCI as positioning related SCI with conventional NR-V2X service related 2-stage SCI transmitted through a PSCCH and a PSSCH.

Example of Communication System to which the Present Disclosure is Applied

The various descriptions, functions, procedures, proposals, methods, and/or operational flowcharts of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

Figure 25:
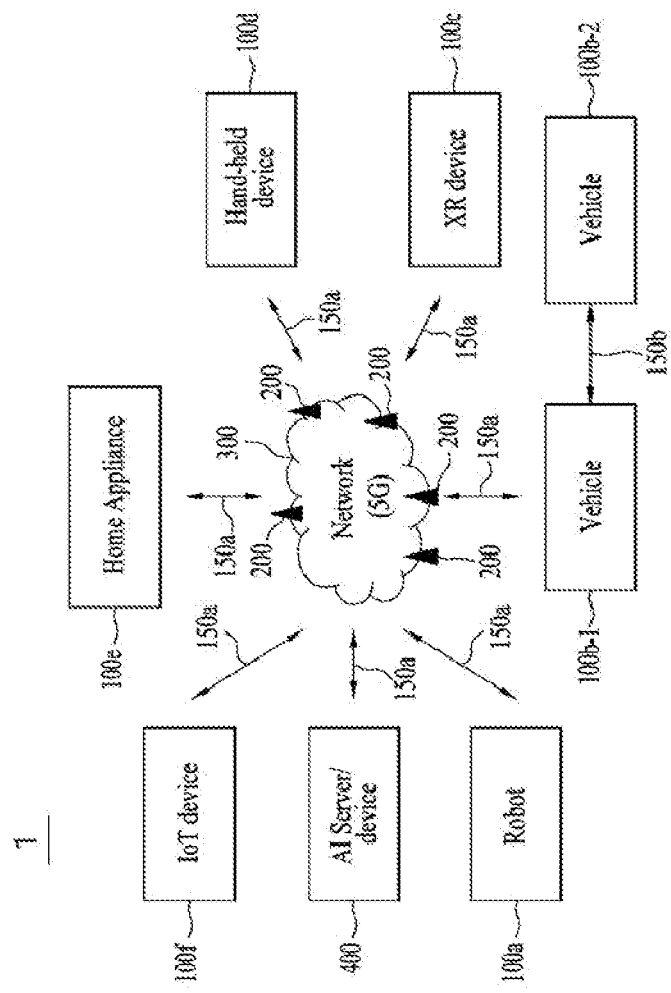
FIG. 25 illustrates a communication system applied to the present disclosure.

FIG. 25 illustrates a communication system applied to the present disclosure.

Referring to FIG. 25, a communication system 1 applied to the present disclosure includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous driving vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BS s/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g. relay, Integrated Access Backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Example of Wireless Devices to which the Present Disclosure is Applied

Figure 26:
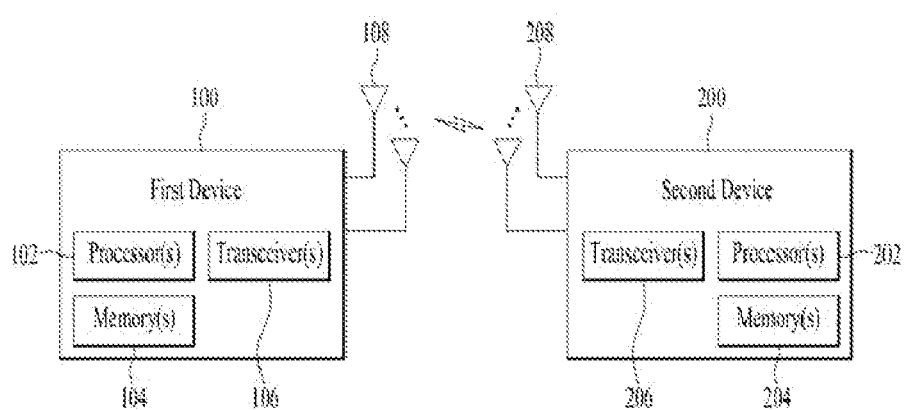
FIG. 26 illustrates wireless devices applicable to the present disclosure.

FIG. 26 illustrates wireless devices applicable to the present disclosure.

Referring to FIG. 26, a first wireless device 100 and a second wireless device 200 may transmit radio signals through a variety of RATs (e.g., LTE and NR). Herein, {the first wireless device 100, the second wireless device 200} may correspond to {the wireless device 100x, the base station 200} and/or {the wireless device 100x, the wireless device 100x} of FIG. 25.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

In detail, the UE or the vehicle may include the processor 102 and the memory 104 that are connected to the RF transceiver. The memory 104 may contain at least one program for performing an operation related to the embodiments described with reference to FIGS. 12 to 24.

The processor 102 may receive a request positioning reference signal (PRS) from a positioning UE, may determine a direction angle based on the positioning UE, based on the request PRS, may determine a response PRS identifier (ID) corresponding to a request PRS ID of the request PRS based on the determined direction angle, and may transmit a response PRS corresponding to the determined response PRS ID. The processor 102 may perform the operation for determining the absolute position of the UE according to embodiments for performing control information transmission method for sidelink positioning described with reference to FIGS. 12 to 24 based on the program contained in the memory 104.

A chip set including the processor 102 and the memory 104 may be configured. In this case, the chip set may include at least one processor and at least one memory operatively connected to the at least one processor and allowing the at least one processor to perform an operation when being executed, and the operation may include receiving a request positioning reference signal (PRS) from a positioning UE, determining a direction angle based on the positioning UE, based on the request PRS, determining a response PRS identifier (ID) corresponding to a request PRS ID of the request PRS based on the determined direction angle, and transmitting a response PRS corresponding to the determined response PRS ID. The processor 102 may perform the operation for determining the absolute position of the UE according to embodiments for performing control information transmission method for sidelink positioning described with reference to FIGS. 12 to 24 based on the program contained in the memory 104.

A computer readable recording medium including at least computer program for allowing the at least one processor to perform an operation may be provided, and the operation may include determining at least one transmission slot for transmission of first positioning sidelink control information (PSCI) and second PSCI, determining at least one physical channel for transmission of the first PSCI and the second PSCI, mapping the first PSCI and the second PSCI to the at least one determined transmission slot and the at least one determined physical channel, and transmission the mapped first PSCI and second PSCI. The processor 102 may perform the operation for determining the absolute position of the UE according to embodiments for performing control information transmission method for sidelink positioning described with reference to FIGS. 12 to 24 based on the program contained in the memory 104.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

The processor 202 may determine at least one transmission slot for transmission of first positioning sidelink control information (PSCI) and second PSCI, may determine at least one physical channel for transmission of the first PSCI and the second PSCI, may map the first PSCI and the second PSCI to the at least one determined transmission slot and the at least one determined physical channel, and may transmit the mapped first PSCI and second PSCI. The processor 202 may perform the operation for determining the absolute position of the UE according to embodiments for performing control information transmission method for sidelink positioning described with reference to FIGS. 12 to 24 based on the program contained in the memory 204.

A chip set including the processor 202 and the memory 204 may be configured. In this case, the chip set may include at least one processor and at least one memory operatively connected to the at least one processor and allowing the at least one processor to perform an operation when being executed, and the operation may include determining at least one transmission slot for transmission of first positioning sidelink control information (PSCI) and second PSCI, determining at least one physical channel for transmission of the first PSCI and the second PSCI, mapping the first PSCI and the second PSCI to the at least one determined transmission slot and the at least one determined physical channel, and transmitting the mapped first PSCI and second PSCI. The processor 202 may perform the operation for determining the absolute position of the UE according to embodiments for performing control information transmission method for sidelink positioning described with reference to FIGS. 12 to 24 based on the program contained in the memory 204.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Examples of Application of Wireless Device Applicable to the Present Disclosure

Figure 27:
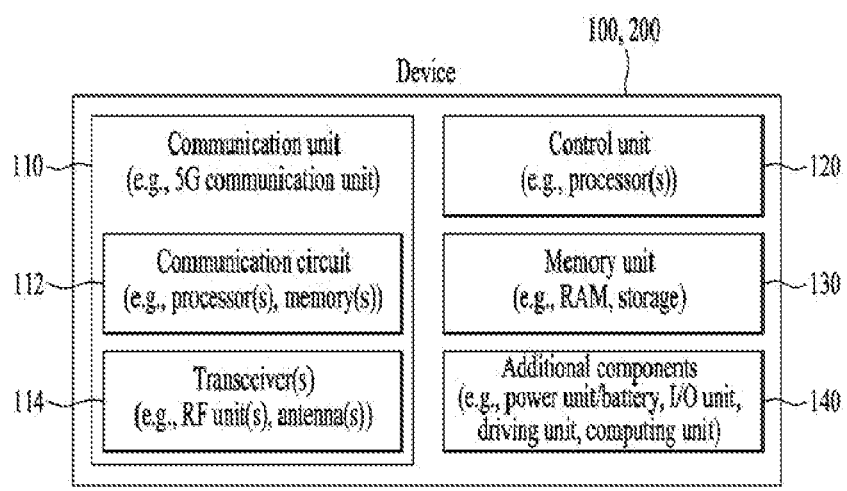
FIG. 27 illustrates another example of a wireless device applicable to the present disclosure.

FIG. 27 illustrates another example of a wireless device applied to the present disclosure. The wireless device may be implemented in various forms according to a use-case/service (refer to FIG. 25).

Referring to FIG. 27 wireless devices 100 and 200 may correspond to the wireless devices 100 and 200 of FIG. 26 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 26. For example, the transceiver(s) 114 may include the one or more transceivers 106 and 206 and/or the one or more antennas 108 and 208 of FIG. 26. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 25), the vehicles (100b-1 and 100b-2 of FIG. 25), the XR device (100c of FIG. 25), the hand-held device (100d of FIG. 25), the home appliance (100e of FIG. 25), the IoT device (100f of FIG. 25), a digital broadcast terminal, a hologram device, a public safety device, an MTC device, a medicine device, a FinTech device (or a finance device), a security device, a climate/environment device, the AI server/device (400 of FIG. 25), the BSs (200 of FIG. 25), a network node, etc. The wireless device may be used in a mobile or fixed place according to a use-example/service.

In FIG. 27, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an electronic control unit (ECU), a graphical processing unit, and a memory control processor. As another example, the memory 130 may be configured by a RAM, a DRAM, a ROM, a flash memory, a volatile memory, a non-volatile memory, and/or a combination thereof.

Figure 28:
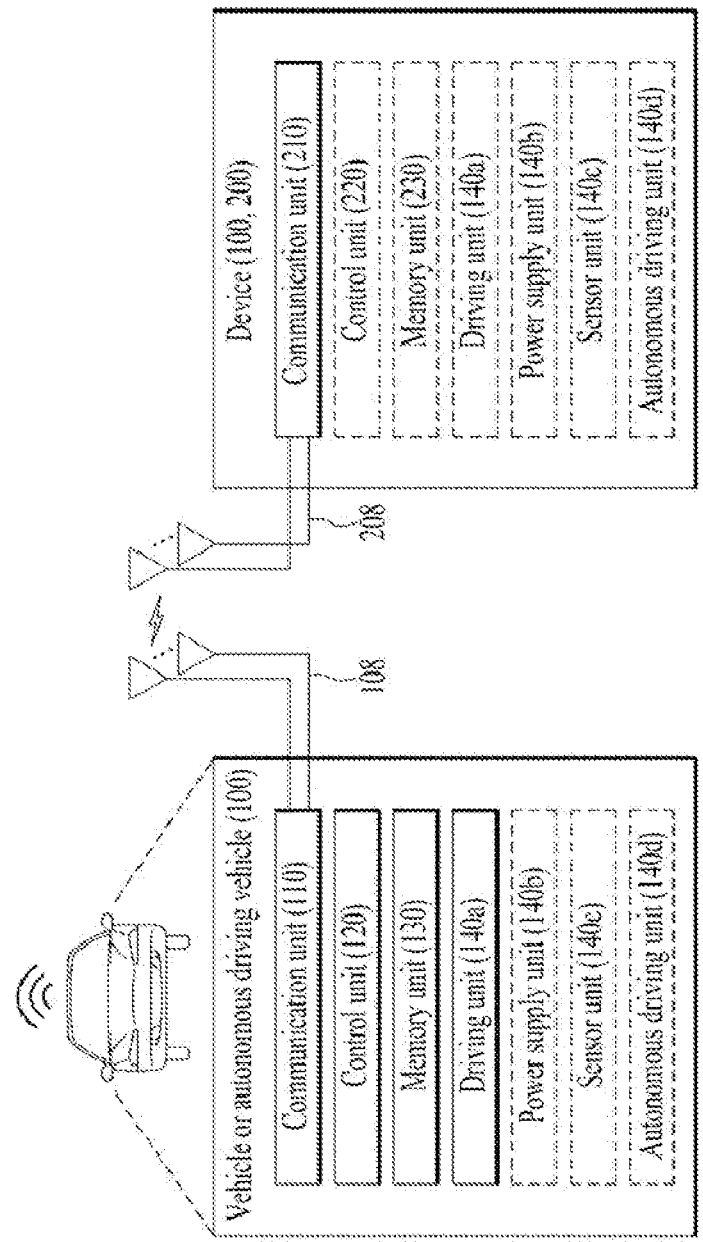
FIG. 28 illustrates a vehicle or an autonomous driving vehicle applied to the present disclosure.

Example of a Vehicle or an Autonomous Driving Vehicle to which the Present Disclosure is Applied FIG. 28 illustrates a vehicle or an autonomous driving vehicle applied to the present disclosure. The vehicle or autonomous driving vehicle may be implemented by a mobile robot, a car, a train, a manned/unmanned Aerial Vehicle (AV), a ship, etc.

Referring to FIG. 28, a vehicle or autonomous driving vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 27, respectively.

The antenna unit 108 may include a plurality of distributed antennas distributed and arranged in the vehicle. The position of the distributed antennas arranged in the vehicle may be different depending on the vehicle. A reference point indicating a relative position in the vehicle of the distributed antenna may be predefined and may be recorded and maintained in a memory included in the vehicle. In this case, the reference point may be differently defined according to the vehicle.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous driving vehicle 100. The control unit 120 may include an Electronic Control Unit (ECU). The driving unit 140a may cause the vehicle or the autonomous driving vehicle 100 to drive on a road. The driving unit 140a may include an engine, a motor, a powertrain, a wheel, a brake, a steering device, etc. The power supply unit 140b may supply power to the vehicle or the autonomous driving vehicle 100 and include a wired/wireless charging circuit, a battery, etc. The sensor unit 140c may acquire a vehicle state, ambient environment information, user information, etc. The sensor unit 140c may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140d may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140d may generate an autonomous driving path and a driving plan from the obtained data. The control unit 120 may control the driving unit 140a such that the vehicle or the autonomous driving vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140c may obtain a vehicle state and/or surrounding environment information. The autonomous driving unit 140d may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous driving vehicles and provide the predicted traffic information data to the vehicles or the autonomous driving vehicles.

Here, a wireless communication technology implemented in the wireless devices XXX and YYY in the present disclosure may include Narrowband Internet of Things for low power communication as well as LTE, NR, and 6G. In this case, for example, the NB-IoT technology may be an example of a Low Power Wide Area Network (LPWAN) technology and may be implemented in standards such as LTE Cat NB1 and/or LTE Cat NB2, and is not limited to the above-described name. Additionally or alternatively, the wireless communication technology implemented in the wireless devices XXX and YYY may be performed based on the LTE-M technology. In this case, for example, the LTE-M technology may be an example of the LPWAN technology and may be called various terms such as enhanced Machine Type Communication (eMTC). For example, the LTE-M technology may be implemented as at least one of various standards such as 1) LTE CAT (LTE Category) 0, 2) LTE Cat M1, 3) LTE Cat M2, 4) LTE non-BL (non-Bandwidth Limited), 5) LTE-MTC, 6) LTE Machine Type Communication, and/or 7) LTE M and may not be limited to the aforementioned terms. Additionally or alternatively, the wireless communication technology implemented in the wireless devices XXX and YYY according to the present disclosure may include at least one of ZigBee, Bluetooth, or Low Power Wide Area Network (LPWAN) in consideration of low power communication and is not limited to the aforementioned terms. For example, the ZigBee technology may generate personal area networks (PAN) associated with small/low-power digital communication based on various standards such as IEEE 802.15.4 and may be called various terms.

The embodiments of the present disclosure described above are combinations of elements and features of the present disclosure. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present disclosure or included as a new claim by a subsequent amendment after the application is filed.

In this document, the embodiments of the present disclosure have been described centering on a data transmission and reception relationship between a UE and a BS. The transmission and reception relationship may be equally/similarly extended to signal transmission/reception between a UE and a relay or between a BS and a relay. In this document, a specific operation described as performed by the BS may be performed by an upper node of the BS as necessary. In other words, it will be obvious to those skilled in the art that various operations for enabling the base station to communicate with the terminal in a network composed of several network nodes including the base station will be conducted by the base station or other network nodes other than the base station. The term "base station (BS)" may be replaced with a fixed station, Node-B, eNode-B (eNB), or an access point as necessary. The term "terminal" may also be replaced with a user equipment (UE), a mobile station (MS), or a mobile subscriber station (MSS) as necessary.

The embodiments of the present disclosure may be achieved via various means, for example, hardware, firmware, software, or combinations thereof. In a hardware configuration, the embodiments of the present disclosure may be achieved by at least one of application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In a firmware or software configuration, the embodiments of the present disclosure may be implemented in the form of a module, a procedure, a function, etc. for performing the above-described functions or operations. Software code may be stored in the memory and executed by the processor. The memory is located at the interior or exterior of the processor and may transmit and receive data to and from the processor via various known means.

Various embodiments of the present disclosure may be carried out in other specific ways than those set forth herein without departing from the spirit and essential characteristics of the present disclosure. The above implementations are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

INDUSTRIAL AVAILABILITY

The above-described embodiments of the present disclosure are applicable to various devices capable of communicating through sidelink.

The invention claimed is:

1. A method of transmitting control information for sidelink positioning in an NR-V2X communication system, the method comprising:
   determining at least one transmission slot for transmitting first positioning sidelink control information (PSCI) and second PSCI;
   determining at least one physical channel for transmitting the first PSCI and the second PSCI;
   mapping the first PSCI and the second PSCI to the at least one determined transmission slot and the at least one determined physical channel; and
   transmitting the mapped first PSCI and second PSCI.

2. The method of claim 1, wherein the transmission slot includes an NR-V2X service slot and a positioning reference signal (PRS) slot.

3. The method of claim 2, wherein the physical channel includes a physical sidelink control channel (PSCCH), a physical sidelink shared channel (PSSCH), an enhanced PSCCH (ePSCCH), and an enhanced PSSCH (ePSSCH).

4. The method of claim 3, wherein the first PSCI and the second PSCI are mapped to the different physical channels.

5. The method of claim 4, wherein the first PSCI and the second PSCI are mapped to the different physical channels in the one transmission slot,
   are mapped to the different physical channels of the same type of the consecutive transmission slots,
   are mapped to the different physical channels of the same type of the inconsecutive transmission slots,
   are mapped to the different physical channels of the different types of the consecutive transmission slots, or
   are mapped to the different physical channels of the different types of the inconsecutive transmission slots.

6. The method of claim 1, wherein the transmission slot and the physical channel are determined based on at least one of an amount of control information for positioning, a positioning method, a number of antenna groups to be used in positioning, or a type of positioning.

7. The method of claim 1, wherein a resource allocation position of the second PSCI mapped to the transmission slot and the physical channel is used for the first PSCI.

8. The method of claim 1, wherein at least one of the mapped first PSCI or second PSCI is interleaved and transmitted.

9. An apparatus for transmitting control information for sidelink positioning, the apparatus comprising:
   a radio frequency (RF) transceiver; and
   a processor connected to the RF transceiver,
   wherein the processor determines at least one transmission slot for transmitting first positioning sidelink control information (PSCI) and second PSCI, determines at least one physical channel for transmitting the first PSCI and the second PSCI, maps the first PSCI and the second PSCI to the at least one determined transmission slot and the at least one determined physical channel, and transmits the mapped first PSCI and second PSCI.

10. The apparatus of claim 9, wherein the transmission slot includes an NR-V2X service slot and a positioning reference signal (PRS) slot.

11. The apparatus of claim 10, wherein the physical channel includes a physical sidelink control channel (PSCCH), a physical sidelink shared channel (PSSCH), an enhanced PSCCH (ePSCCH), and an enhanced PSSCH (ePSSCH).

12. The apparatus of claim 11, wherein the first PSCI and the second PSCI are mapped to the different physical channels.

13. The apparatus of claim 12, wherein the processor maps the first PSCI and the second PSCI
   to the different physical channels in the one transmission slot,
      to the different physical channels of the same type of the consecutive transmission slots,
   to the different physical channels of the same type of the inconsecutive transmission slots,
   to the different physical channels of the different types of the consecutive transmission slots, or
   to the different physical channels of the different types of the inconsecutive transmission slots.

14. The apparatus of claim 9, wherein the processor determines the at least one transmission slot and the at least one physical channel for transmission of the first PSCI and the second PSCI based on at least one of an amount of control information for positioning, a positioning method, a number of antenna groups to be used in positioning, or a type of positioning.

15. The apparatus of claim 9, wherein a resource allocation position of the second PSCI mapped to the transmission slot and the physical channel is used for the first PSCI.

16. The apparatus of claim 9, wherein the processor interleaves at least one of the mapped first PSCI or second PSCI.

17. The apparatus of claim 9, wherein the apparatus is capable of communicating with at least one of another apparatus, a user equipment (UE) related to an autonomous driving vehicle, a base station (BS) or a network.

* * * * *